(12) United States Patent
Terazono et al.

(10) Patent No.: US 7,222,137 B2
(45) Date of Patent: May 22, 2007

(54) DIFFERENCE UPDATING METHOD, PROGRAM AND APPARATUS

(75) Inventors: Kohei Terazono, Kawasaki (JP); Yoshiyuki Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 474 days.

(21) Appl. No.: 10/735,880

(22) Filed: Dec. 16, 2003

(65) Prior Publication Data
US 2004/0128281 A1 Jul. 1, 2004

(30) Foreign Application Priority Data
Dec. 16, 2002 (JP) ............... 2002-363362

(51) Int. Cl.
*G06F 17/30* (2006.01)
(52) U.S. Cl. ...................... 707/202; 707/201
(58) Field of Classification Search .................... 707/1, 707/2, 10, 6, 201, 202; 711/165
See application file for complete search history.

(56) References Cited

U.S. PATENT DOCUMENTS

| 6,018,747 | A | 1/2000 | Burns et al. |
| 6,236,993 | B1 * | 5/2001 | Fanberg ..................... 707/6 |
| 2004/0044869 | A1 * | 3/2004 | Louie et al. ................. 711/165 |

FOREIGN PATENT DOCUMENTS

| EP | 0 665 670 A2 | 8/1995 |
| EP | 0 665 670 A3 | 3/1996 |
| EP | 1 206 148 | 5/2002 |
| JP | 6-274384 | 9/1994 |
| JP | 7-219780 | 8/1995 |
| JP | 10-13494 | 1/1998 |

OTHER PUBLICATIONS

K. Coppieters, "A Cross-Platform Binary Diff", Dr. Dobb's Journal, Redwood City, CA, US, May 1995, pp. 32, 35-36, XP000601152.
Anonymous, "Logging Status Information While Installing New Software", IBM Technical Disclosure Bulletin, IBM Corp., New York, US, vol. 34, No. 1, Jun. 1991, p. 177, XP000210175, ISSN: 0018-8689.
European Search Report issued on Aug. 4, 2006, in European Patent Application No. 03028525.8-2211 related to the present above-identified pending US patent application (3 pages).

* cited by examiner

*Primary Examiner*—Apu M. Mofiz
(74) *Attorney, Agent, or Firm*—Staas & Halsey LLP

(57) ABSTRACT

Difference data reception unit receives difference data for all segments and stores it in nonvolatile memory. Restoration processing unit stores restoration process segment number indicative current process segment in the nonvolatile memory, and then restores segment data from difference data and stores it in nonvolatile memory. Overwrite processing unit stores overwrite processing segment number indicative of immediately preceding process segment nonvolatile memory, and then reads restored data which is restored on the immediately preceding segment from nonvolatile memory and overwrites it onto the data to be written of the volatile memory. If the power supply is interrupted during restoration process of segment data, a resuming processing unit resumes restoration process from the head of the segment of the restoration process segment number and if the power supply is interrupted during the overwriting process of the segment data, resumes the overwriting process from the head of the overwrite processing segment number.

22 Claims, 30 Drawing Sheets

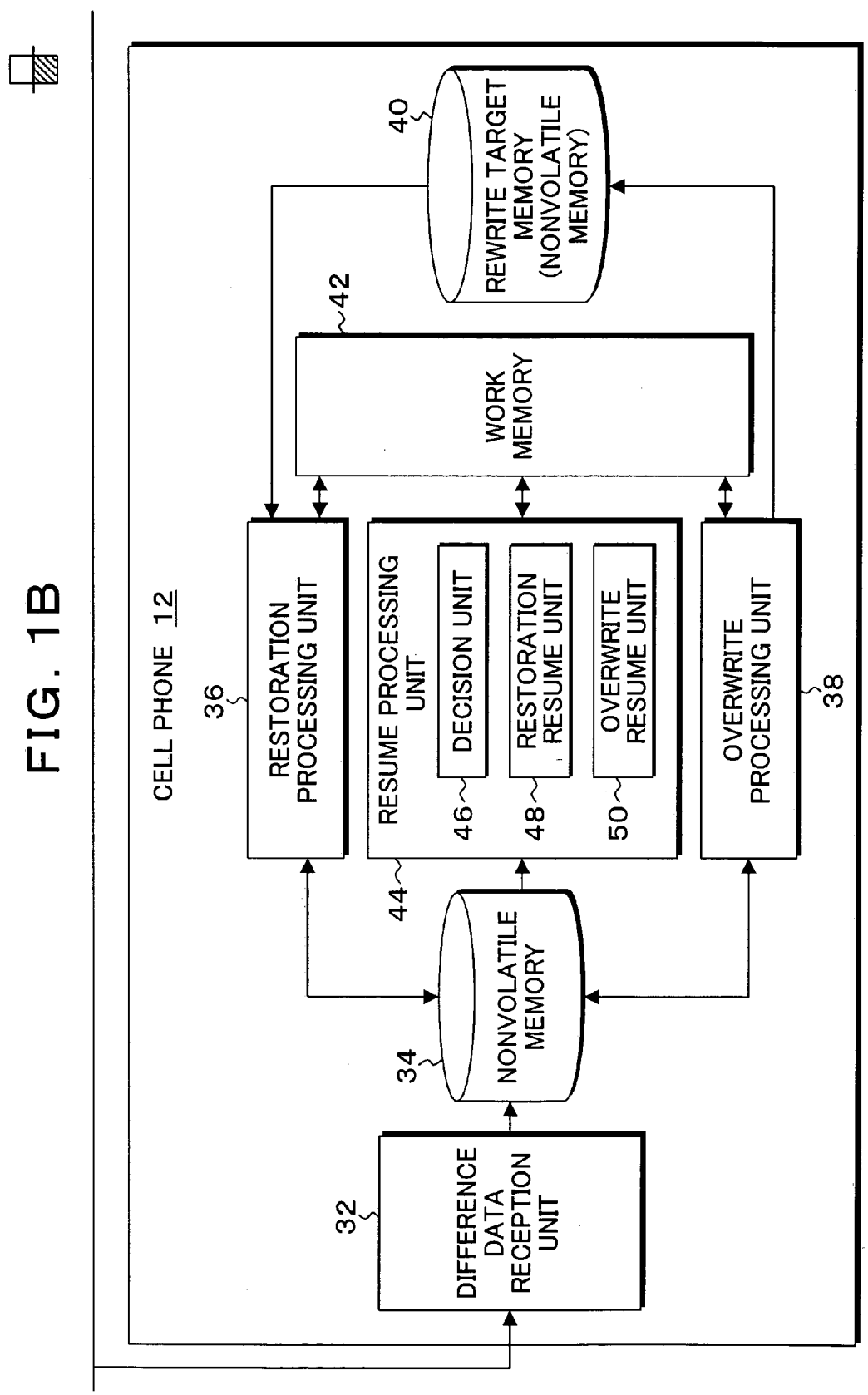

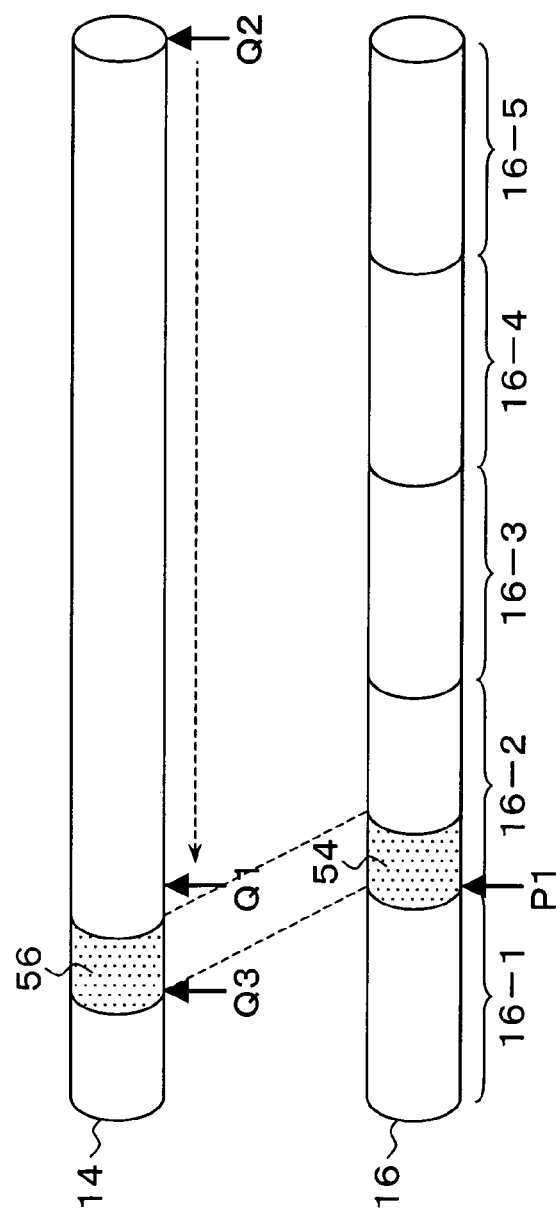

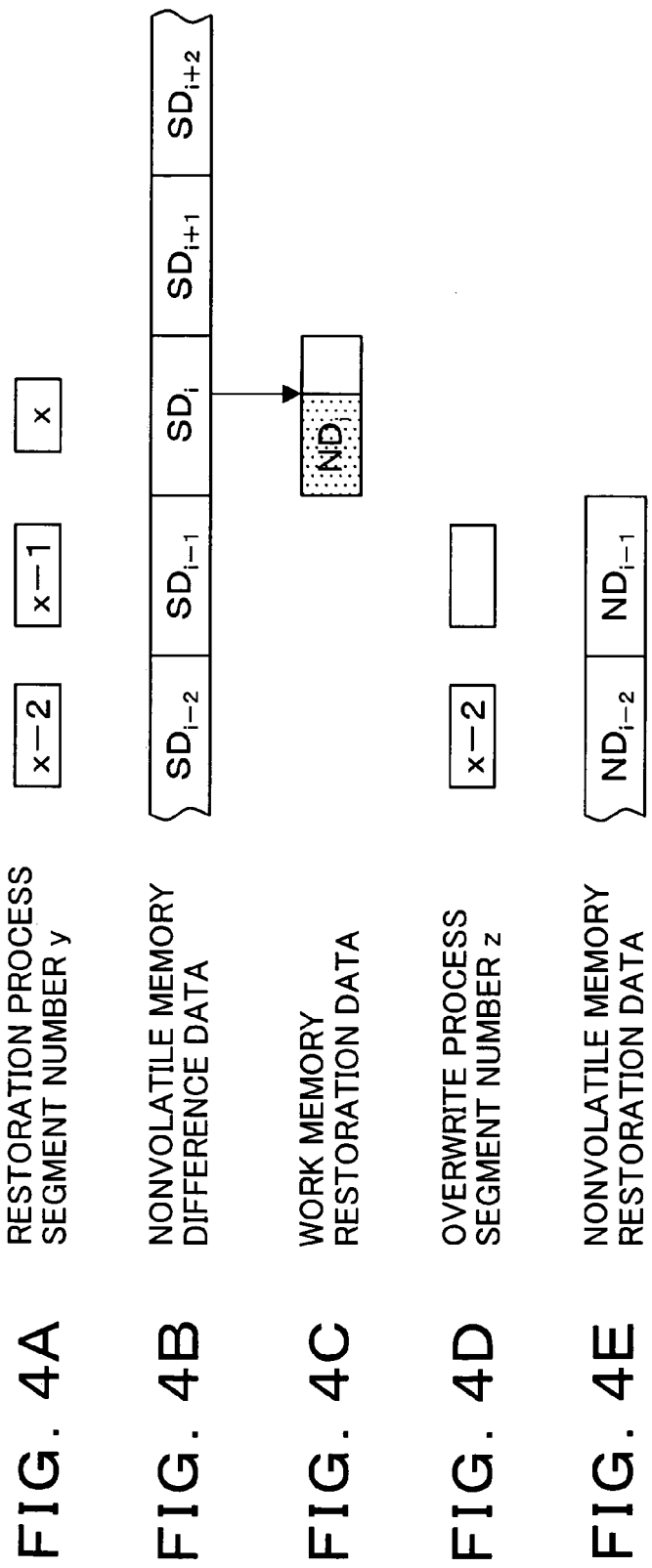

FIG. 5A  RESTORATION PROCESS SEGMENT NUMBER y 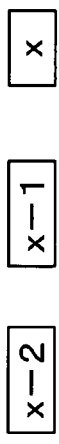
FIG. 5B  NONVOLATILE MEMORY DIFFERENCE DATA 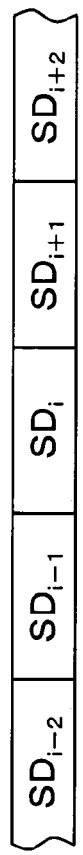
FIG. 5C  WORK MEMORY RESTORATION DATA 
FIG. 5D  OVERWRITE PROCESS SEGMENT NUMBER z 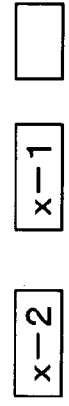
FIG. 5E  NONVOLATILE MEMORY RESTORATION DATA 

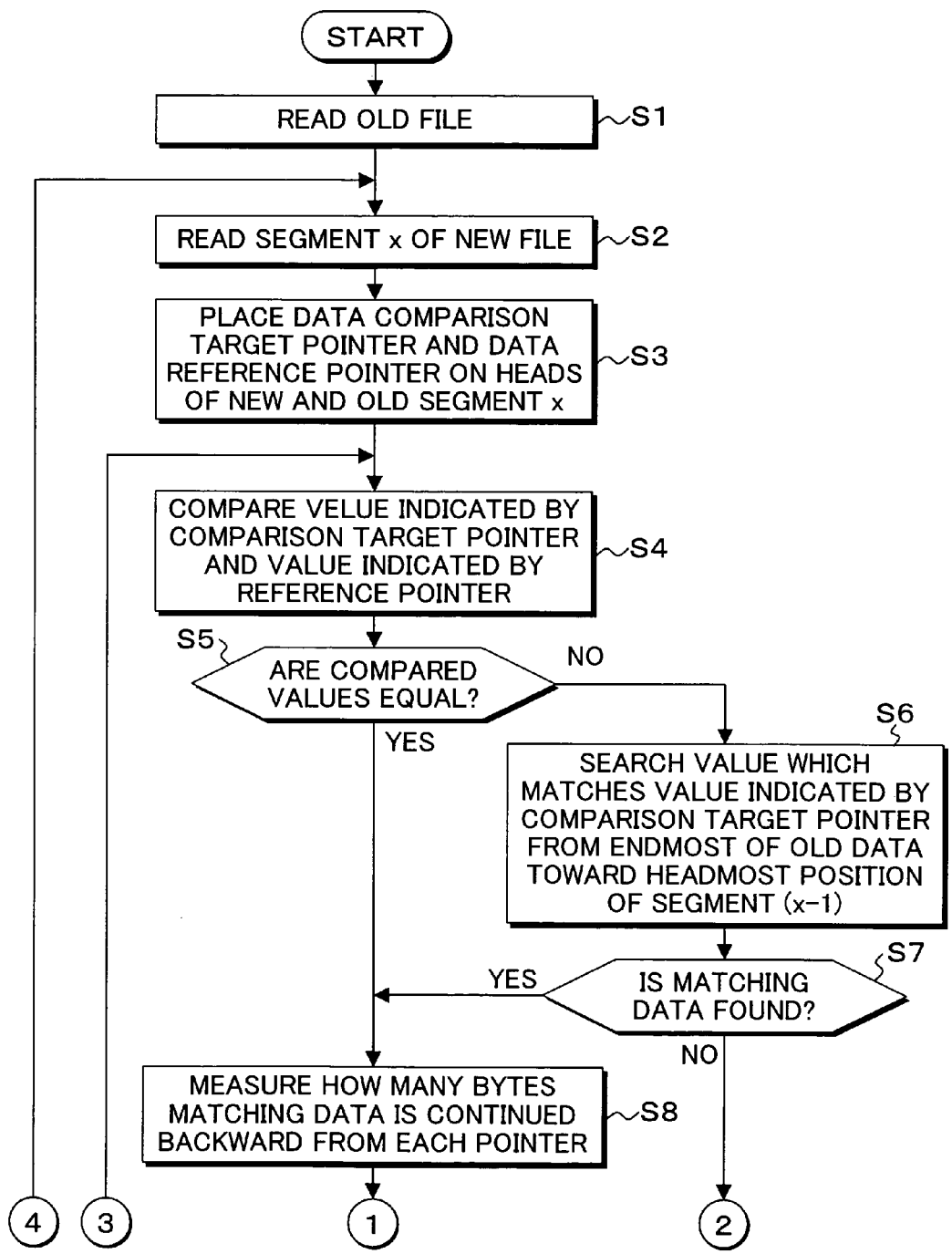

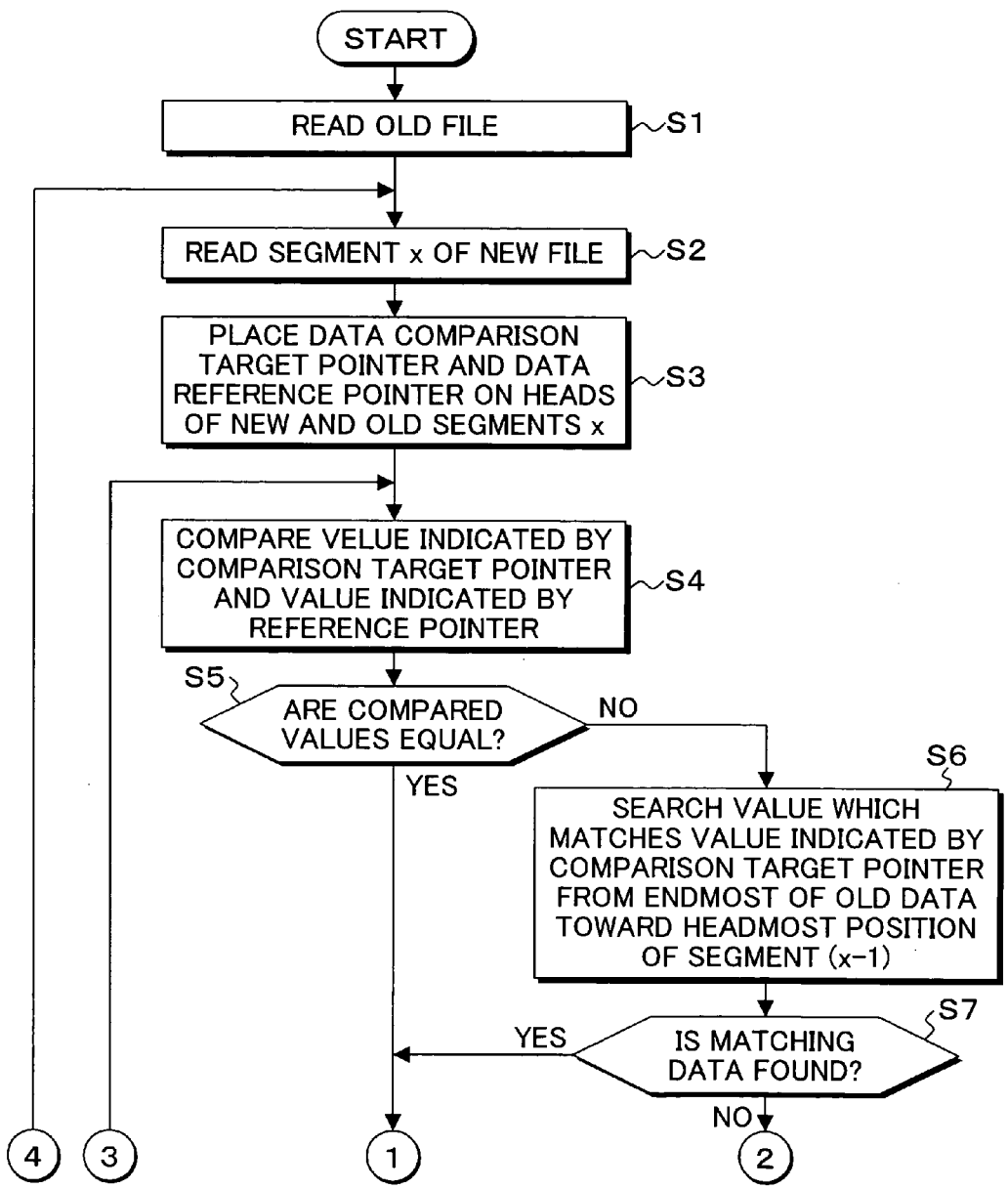

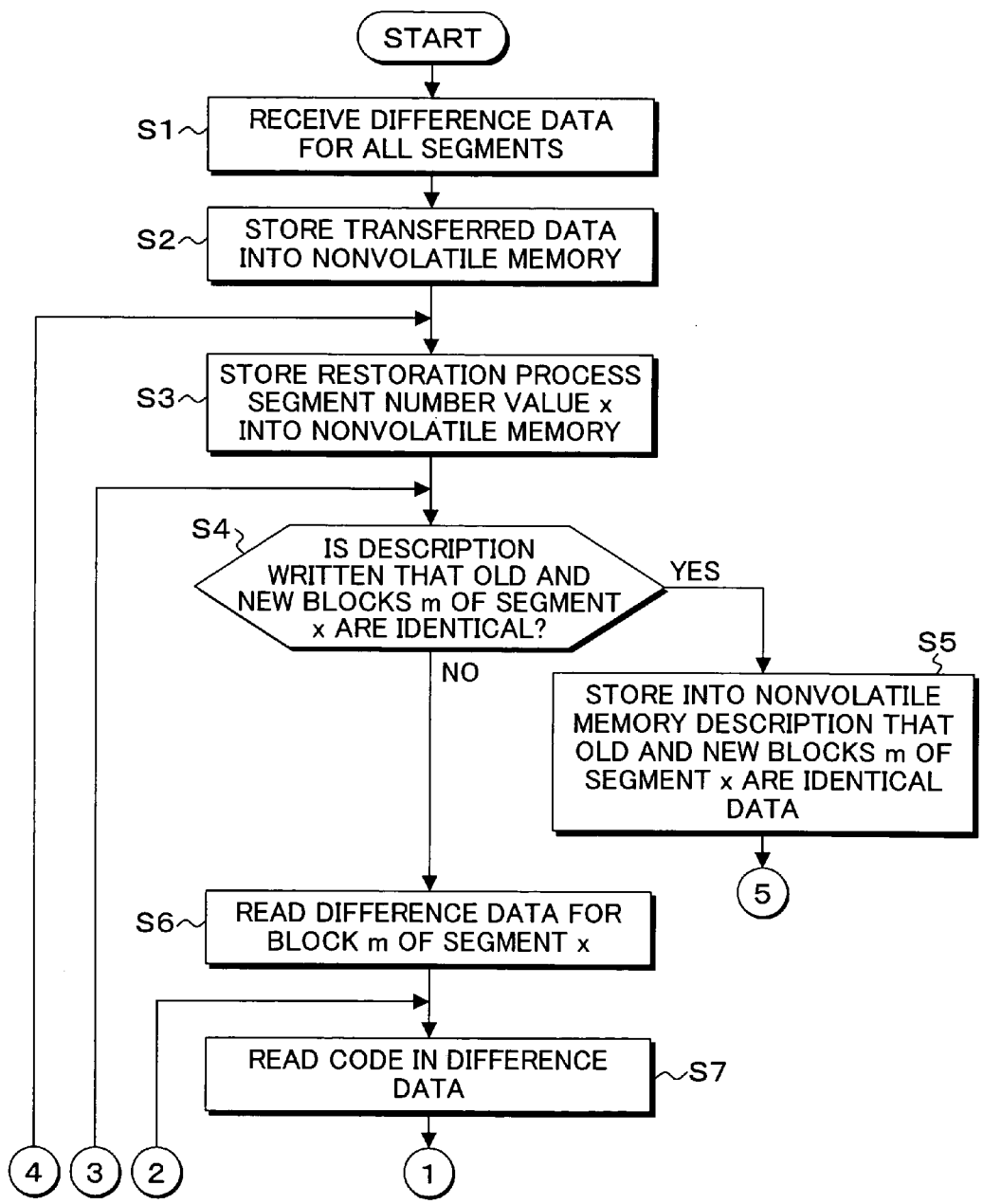

DIFFERENCE UPDATING METHOD, PROGRAM AND APPARATUS

BACKGROUND OF THE INVENTION

1. Field of the Invention

The present invention relates generally to a difference updating method, program and apparatus for updating data of a file to be rewritten, by receiving difference data generated from two (2), old and new files, and more particularly to a difference updating method, program and apparatus for resuming a data updating process from the middle of the process after recovery of power supply interrupted during updating of the data.

2. Description of the Related Arts

Conventionally, embedded systems such as portable terminals have limitation, such as that speed of communication with outside is low, and available work memory is small. In this environment, in order to update software stored in internal memory in a short period of time, a difference updating method utilizing old and new difference data of software is available.

When software stored in built-in memory of the embedded system is updated by the use of the difference updating method, if the amount of data to be updated is high, size of th difference data becomes large and can not be contained in available memory of the embedded system.

In this case, the entire data to be written (software) will be divided into several segments, and the updating process is executed to each one. Flow of the updating process in this case is as follows.

S1: The difference data for updating one (1) segment of the data to be written is transferred from outside and received.

S2: New one (1) segment of new data is generated from one (1) segment of the data to be written corresponding to the received one (1) segment of the difference data.

S3: The generated one (1) segment of new data is overwritten onto one segment of the data to be written.

However, in this difference updating process, when power supply to a cell phone is turned off in the middle of a process which overwrites new data generated for each segment from the difference data onto the data to be written, if it is attempted to resume the difference updating process after power supply is recovered, since the rewrite target terminal is in the state that it is rewritten partway, and data to be referenced by the difference data is lost, the updating process can not be continued.

Also, one (1) segment of new data which was generated when power supply was interrupted is lost by the power interruption, and it is not possible to reattempt overwriting of the corresponding data to be written with the resuming process according to power recovery.

Therefore, if power supply is interrupted during an overwriting process of data, it is needed to have the updated data itself transferred in order to complete the update, and if the updated data itself is received, since the amount thereof will be much larger size than the difference data, it is imperative to increase time of the updating process.

SUMMARY OF THE INVENTION

It is therefore the object of the present invention to provide a difference updating method, program and apparatus which enables a data updating process to be resumed from the middle of the process after power supply is recovered when power supply has been interrupted during the updating process for restoring new data from difference data for each transferred segment and overwriting the restored new data onto data to be written.

(Method)

In order to achieve the above object, the present invention provides a difference updating method comprising:

a difference data reception step, with a difference data reception unit, receiving difference data of all the segments which is generated for each segment by dividing a new one of two old and new files into a plurality of segments of the same size and searching for a data row matching a data row in each segment within the range from the position which is one segment before the starting position of a target segment of the old file to the endmost of the old file and storing the received difference data into a nonvolatile memory;

a restoration processing step, with a restoration processing unit, storing the restoration process segment number (X) indicative of a current process segment into the nonvolatile memory, thereafter restoring segment data from one segment of the difference data and storing the restored segment data into the nonvolatile memory; and an overwrite processing step, with an overwrite processing unit, storing the overwrite processing segment number (X−1) indicative of an immediately preceding process segment into the nonvolatile memory, thereafter reading from the nonvolatile memory the restored data which has been restored on the immediately preceding segment and overwriting the read restored data onto data to be rewritten in a nonvolatile memory. Herein, the difference data reception step may include receiving the difference data for each segment which is generated by searching for a data row matching a data row in each segment within the range from the starting position of a target segment of the old file to the endmost of the old file.

The difference updating method of the present invention further comprises:

a decision step, with a decision unit, deciding whether the power supply is interrupted during the restoration process of the segment data or the power supply is interrupted during the overwriting process of the segment data, after the power supply is recovered in the case of power interruption;

a restoration resume step, with a restoration resume unit, resuming the restoration process from the head of the segment of the restoration process segment number read from the nonvolatile memory after the power recovery in the case where the power supply has been interrupted during the restoration process of the segment data; and an overwriting resume step, with an overwriting resume unit, resuming the overwriting process from the head of the overwrite processing segment number read from the nonvolatile memory after the power recovery in the case where the power supply has been interrupted during the overwriting process of the segment data.

By using the difference updating method according to the invention, if power supply is interrupted during an updating process from difference data of each segment, which is included in processing procedures of the divided difference updating process on the embedded system such as a cell phone, it is possible to resume the updating procedure from that segment after power supply is recovered.

Also, at the time of power interruption during restoring data as well as at the time of power interruption during overwriting process of old data, the process before interruption will be continued after power is recovered, therefore it is possible to resume the process without executing unnecessary restoration processes and overwriting processes.

Herein, the decision step includes calculating a difference between the restoration process segment number and the overwrite processing segment number after the power supply is recovered in the case of the power interruption, deciding that the power supply was interrupted during the restoration process if the difference is 1, and deciding that the power supply was interrupted during the overwriting process if the difference is 2.

The restoration processing step includes deciding whether the content of the restored segment data which is restored from one segment of the difference data and the content of the corresponding segment data of the data to be written are identical or not, and, if these are identical, describing into the nonvolatile memory that the old and the new are identical, instead of the restored segment data. The overwrite processing step includes skipping the overwriting of the restored segment data if it is described in the nonvolatile memory that the old and the new are identical.

Consequently, if new data restored from difference data of each segment is identical to the data to be written (old data), the processing time will be reduced by making the writing of new data into the nonvolatile memory and the overwriting onto the memory which stores old data unnecessary, and by doing nothing when there is no need to execute the process.

The restoration processing step further includes equally dividing the restored segment data which is restored from one segment of the difference data into n pieces of restored block data, deciding whether the restored block data and the rewrite data are identical or not for each block, and, if these are identical, describing into the nonvolatile memory that the old and the new are identical, instead of the restored block data. The overwrite processing step includes skipping the overwriting of the restored block data if it is described in the nonvolatile memory that the old and the new are identical.

In this way, the processing time will be further reduced by dividing one (1) segment of new data restored into n blocks, by making the writing of new data into the nonvolatile memory and the overwriting onto the memory which stores old data unnecessary if it is identical to old data, and by doing nothing when there is no need to execute the process for each block unit.

In another form of the difference updating method according to the invention, a difference updating method is provided which receives and updates the difference data processed by further dividing difference data of each segment into n blocks. This difference updating method comprises:

a difference data reception step, with a difference data reception unit, generating difference data for each segment by dividing a new one of two old and new files into a plurality of segments of the same size and searching for a data row matching a data row in each segment within the range from the position which is one segment before the starting position of a target segment of the old file to the endmost of the old file, as well as equally dividing one segment of the old and new data into n blocks, deciding whether the block data of new file and the block data of old file are identical or not on a block-to-block basis, and, if these are identical, describing that the old and the new are identical into the difference data, instead of the difference block data, receiving the difference data of all the segments which has the description and storing the received difference data into a nonvolatile memory;

a restoration processing step, with a restoration processing unit, storing the restoration process segment number (X) indicative of a current process segment into the nonvolatile memory, thereafter restoring the block data which is divided into n pieces per one segment of the difference data and storing the restored block data into the nonvolatile memory; and an overwrite processing step, with an overwrite processing unit, storing the overwrite processing segment number (X−1) indicative of an immediately preceding process segment into the nonvolatile memory, thereafter reading from the nonvolatile memory the restored block data which is divided into n pieces per restored data which is restored on the immediately preceding segment and overwriting the read restored block data onto the data to be written in the nonvolatile memory. Herein, for the difference data receiving step, it may be possible to receive difference data generated for each segment by searching for the data row matching the data row in each segment within the range from the position which is one segment before the starting position of the target segment of the old file to the endmost of the old file.

This difference updating method further comprises:

a decision step, with a decision unit, deciding whether the power supply is interrupted during the restoration process of the segment data or the power supply is interrupted during the overwriting process of the segment data, after the power supply is recovered in the case of power interruption;

a restoration resume step, with a restoration resume unit, resuming the restoration process from the head of the segment of the restoration process segment number read from the nonvolatile memory after the power recovery in the case where the power supply has been interrupted during the restoration process of the segment data; and an overwriting resume step, with an overwriting resume unit, resuming the overwriting process from the head of th overwrite processing segment number read from the nonvolatile memory after the power recovery in the case where the power supply has been interrupted during the overwriting process of the segment data.

By using this difference updating method, if power supply is interrupted during an updating process from difference data of each segment, which is included in processing procedures of the divided difference updating process on the embedded system such as a cell phone, it is possible to resume the updating procedure from that segment after power supply is recovered.

Also, at the time of power interruption during restoring data as well as at the time of power interruption during overwriting process of old data, the process before interruption will be continued after power is recovered, therefore it is possible to resume the process without executing unnecessary restoration processes and overwriting processes.

At this point, in a deciding step, difference between a restoration process segment number and the overwrite processing segment number is calculated after power supply is recovered in the case where power supply is interrupted, and if the difference is 1, it is decided as the power interruption during the restoration process, and if the difference is 2, it is decided as the power interruption during the overwriting process.

The restoration processing step includes skipping the restoration process based on the difference block data and describing in the nonvolatile memory that the old and the new are identical, if it is described in the difference block data that the old and the new are identical. The overwrite processing step includes skipping the overwriting of the restored block data, if it is described in the nonvolatile memory that the old and the new are identical.

In this way, the processing time will be reduced by making the writing of new block data into the nonvolatile memory and the overwriting onto the memory which stores old data unnecessary if new block data which is one (1) segment restored from the difference data which is divided into n blocks is identical to old data, and further by doing nothing when there is no need to execute the process for each smaller block unit. Also, the process which divides each segment of the restored data into n blocks and compares old and new data is not needed; therefore, the processing time will be reduced correspondingly.

(Program)

In order to achieve the above object, the present invention provides a program for difference updating executed on a computer in the form of an embedded system of, e.g., a cell phone. This program allows a computer to execute:

a difference data reception step receiving difference data of all the segments which is generated for each segment by dividing a new one of two old and new files into a plurality of segments of the same size and searching for a data row matching a data row in each segment within the range from the position which is one segment before the starting position of a target segment of the old file to the endmost of the old file and storing the received difference data into a nonvolatile memory;

a restoration processing step storing the restoration process segment number (X) indicative of a current process segment into the nonvolatile memory, thereafter restoring segment data from one segment of the difference data and storing the restored segment data into the nonvolatile memory; and an overwrite processing step storing the overwrite processing segment number (X−1) indicative of an immediately preceding process segment into the nonvolatile memory, thereafter reading from the nonvolatile memory the restored data which has been restored on the immediately preceding segment and overwriting the read restored data onto data to be rewritten in the nonvolatile memory.

This program further comprises:

a decision step deciding whether the power supply is interrupted during the restoration process of the segment data or the power supply is interrupted during the overwriting process of the segment data, after the power supply is recovered in the case of power interruption;

a restoration resume step resuming the restoration process from the head of the segment of the restoration process segment number read from the nonvolatile memory after the power recovery in the case where the power supply has been interrupted during the restoration process of the segment data; and an overwriting resume step resuming the overwriting process from the head of the overwrite processing segment number read from the nonvolatile memory after the power recovery in the case where the power supply has been interrupted during the overwriting process of the segment data.

In another form of the program according to the invention, there is provided a program which receives and updates the difference data processed by further dividing old and new data of each segment into n blocks. This program allows a computer to execute:

a difference data reception step generating difference data for each segment by dividing a new one of two old and new files into a plurality of segments of the same size and searching for a data row matching a data row in each segment within the range from the position which is one segment before the starting position of a target segment of the old file to the endmost of the old file, as well as equally dividing one segment of the old and new data into n blocks, deciding whether the block data of new file and the block data of old file are identical or not on a block-to-block basis, and, if these are identical, describing that the old and the new are identical into the difference data, instead of the difference block data, receiving the difference data of all the segments which has the description and storing the received difference data into a nonvolatile memory;

a restoration processing step storing the restoration process segment number (X) indicative of a current process segment into the nonvolatile memory, thereafter restoring the block data which is divided into n pieces per one segment of the difference data and storing the restored block data into the nonvolatile memory; and an overwrite processing step storing the overwrite processing segment number (X−1) indicative of an immediately preceding process segment into the nonvolatile memory, thereafter reading from the nonvolatile memory the restored block data which is divided into n pieces per restored data which is restored on the immediately preceding segment and overwriting the read restored block data onto the data to be written in the nonvolatile memory.

This program further comprises:

a decision step deciding whether the power supply is interrupted during the restoration process of the segment data or the power supply is interrupted during the overwriting process of the segment data, after the power supply is recovered in the case of power interruption;

a restoration resume step resuming the restoration process from the head of the segment of the restoration process segment number read from the nonvolatile memory after the power recovery in the case where the power supply has been interrupted during the restoration process of the segment data; and an overwriting resume step resuming the overwriting process from the head of the overwrite processing segment number read from the nonvolatile memory after the power recovery in the case where the power supply has been interrupted during the overwriting process of the segment data.

(Apparatus)

In order to attain the above object, the present invention provides a difference updating apparatus intended for an embedded system of a cell phone, etc. The difference updating apparatus comprises:

a difference data reception unit for receiving difference data of all the segments which is generated for each segment by dividing a new one of two old and new files into a plurality of segments of the same size and searching for a data row matching a data row in each segment within the range from the position which is one segment before the starting position of a target segment of the old file to the endmost of the old file and storing the received difference data into a nonvolatile memory;

a restoration processing unit for storing the restoration process segment number (X) indicative of a current process segment into the nonvolatile memory, thereafter restoring segment data from one segment of the difference data and storing the restored segment data into the nonvolatile memory;

an overwrite processing unit for storing the overwrite processing segment number (X−1) indicative of an immediately preceding process segment into the nonvolatile memory, thereafter reading from the nonvolatile memory the restored data which has been restored on the immediately preceding segment and overwriting the read restored data onto data to be rewritten in the nonvolatile memory;

a decision unit for deciding whether the power supply is interrupted during the restoration process of the segment data or the power supply is interrupted during the overwriting process of the segment data, after the power supply is recovered in the case of power interruption;

a restoration resume unit for resuming the restoration process from the head of the segment of the restoration process segment number read from the nonvolatile memory after the power recovery in the case where the power supply has been interrupted during the restoration process of the segment data; and an overwriting resume unit for resuming the overwriting process from the head of the overwrite processing segment number read from the nonvolatile memory after the power recovery in the case where the power supply has been interrupted during the overwriting process of the segment data.

In another form of the difference updating apparatus according to th invention, there is provided an apparatus which receives and updates the difference data processed by further dividing old and new data of each segment into n blocks.

This difference updating apparatus comprises:

a difference data reception unit for generating difference data for each segment by dividing a new one of two old and new files into a plurality of segments of the same size and searching for a data row matching a data row in each segment within the range from the position which is one segment before the starting position of a target segment of the old file to the endmost of the old file, as well as equally dividing one segment of the old and new data into n blocks, deciding whether the block data of new file and the block data of old file are identical or not on a block-to-block basis, and, if these are identical, describing that the old and the new are identical into the difference data, instead of the difference block data, receiving the difference data of all the segments which has the description and storing the received difference data into a nonvolatile memory;

a restoration processing unit for storing the restoration process segment number (X) indicative of a current process segment into the nonvolatile memory, thereafter restoring the block data which is divided into n pieces per one segment of the difference data and storing the restored block data into the nonvolatile memory;

an overwrite processing unit for storing the overwrite processing segment number (X–1) indicative of an immediately preceding process segment into the nonvolatile memory, thereafter reading from the nonvolatile memory the restored block data which is divided into n pieces per restored data which is restored on the immediately preceding segment and overwriting the read restored block data onto the data to be written in the nonvolatile memory;

a decision unit for deciding whether the power supply is interrupted during the restoration process of the segment data or the power supply is interrupted during the overwriting process of the segment data, after the power supply is recovered in the case of power interruption;

a restoration resume unit for resuming the restoration process from the head of the segment of the restoration process segment number read from the nonvolatile memory after the power recovery in the case where the power supply has been interrupted during the restoration process of the segment data; and an overwriting resume unit for resuming the overwriting process from the head of the overwrite processing segment number read from the nonvolatile memory after the power recovery in the case where the power supply has been interrupted during the overwriting process of the segment data.

The details of the difference updating apparatus of the present invention are basically the same as those of the difference updating method.

BRIEF DESCRIPTION OF THE DRAWINGS

The above and other objects, aspects, features and advantages of the present invention will become more apparent from the following detailed description when taken in conjunction with the accompanying drawings, in which:

FIGS. 1A and 1B are block diagrams of a first embodiment according to the invention;

FIG. 2 is en explanatory diagram of a difference data generating process in the embodiment of FIGS. 1A and 1B;

FIGS. 4A to 4E are explanatory diagrams of described status of the restoration process segment number and the overwrite processing segment number in the nonvolatile memory during the restoration process of the segment data;

FIGS. 5A to 5E are explanatory diagrams of described status of the restoration process segment number and the overwrite processing segment number during storing into th nonvolatile memory after completion of restoration of the segment data;

FIG. 6A is a flowchart of the difference data generating process on the base station of FIGS. 1A and 1B;

FIG. 10A is a flowchart of the difference data generating process executed on the base station of FIGS. 9A and 9B;

FIG. 11A is a flowchart of the data updating process according to the second embodiment of the invention, executed in the cell phone of FIGS. 9A and 9B;

DESCRIPTION OF THE PREFERRED EMBODIMENTS

Figure 1A:
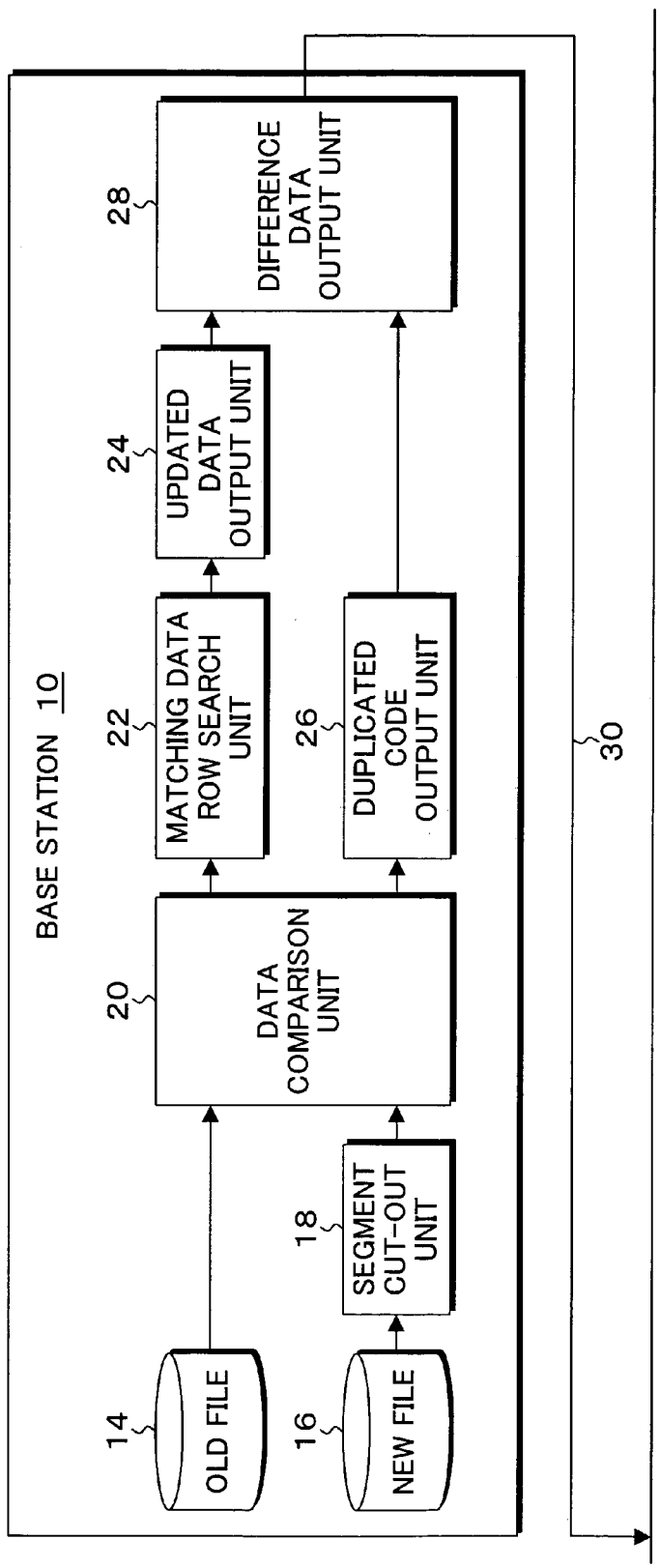

FIGS. 1A and 1B are block diagrams of a first embodiment to which the difference updating method of the invention is applied. In FIGS. 1A and 1B, within a base station 10 which functions as a difference data generating apparatus on the transmitting side, old file 14 and new file 16 is stored in a hard disk drive and the like.

In generation of difference data in the base station 10, the difference data for each segment is generated by dividing a new file 16 into a plurality of segments of constant size, for example 256 KB, and searching for a data row of the old file 14 which matches to a data row of the new file in each segment with in a range from endmost of an old file to the starting position of the target segment.

Therefore, the base station 10 is provided with a segment cut-out unit 18, a data comparison unit 20, a matching data row search unit 22, an updated data output unit 24, a duplicated code output unit 26 and a difference data output unit 28.

FIG. 2 is en explanatory diagram of a difference data generating process in the base station 10 of FIGS. 1A and 1B. The new file 16 is divided into a plurality of segments 16-1 to 16-5 which have constant size, for example 256 KB.

Assuming that a segment 16-2 is currently processed in this new file 16, a data comparison target pointer P1 is set up at a beginning address of the segment 16-2, and also for the old file 14, a data comparison reference pointer Q1 is set up at the same position, then it is checked that whether the data values, for example one (1) byte data, indicated by each pointer P1 and Q1 are matched or not.

If values are matched, measurement is conducted for how many bytes the matching data is continued for backward from this position. If the values no longer matched, "duplicated code", which is combined with the value of the data comparison reference pointer Q1 when the values are matched for the first time and the measured matching length, is output as difference data.

On the other hand, if a value indicated by the data comparison reference pointer Q1 of the old file 14 at the same position of the data comparison target pointer P1 of the new file 16 does not match, a pointer is set up at endmost of the old file 14 like a data comparison reference pointer Q2, then the matching search for the value of data comparison target pointer P1 of the new file 16 is executed by moving the pointer forward, within the range to the segment of the old file 14 immediately preceding to the segment corresponding to the target segment 16-2.

Also, the search range in the old file 14 may be the range from endmost of the new file 16 to the segment of the old file corresponding to the target segment 16-2. The reason for extending the search range of the old file to the range to the segment immediately preceding to the target segment is that, on the difference updating side where the difference date is transferred to and received, which is disclosed in description below, overwriting of updated data to the old file is executed in the segment immediately preceding to the segment where a restoration process is executed, therefore, also on the difference data generating side, the range to the segment immediately preceding to the target segment is considered to be the search range.

Figure 3:
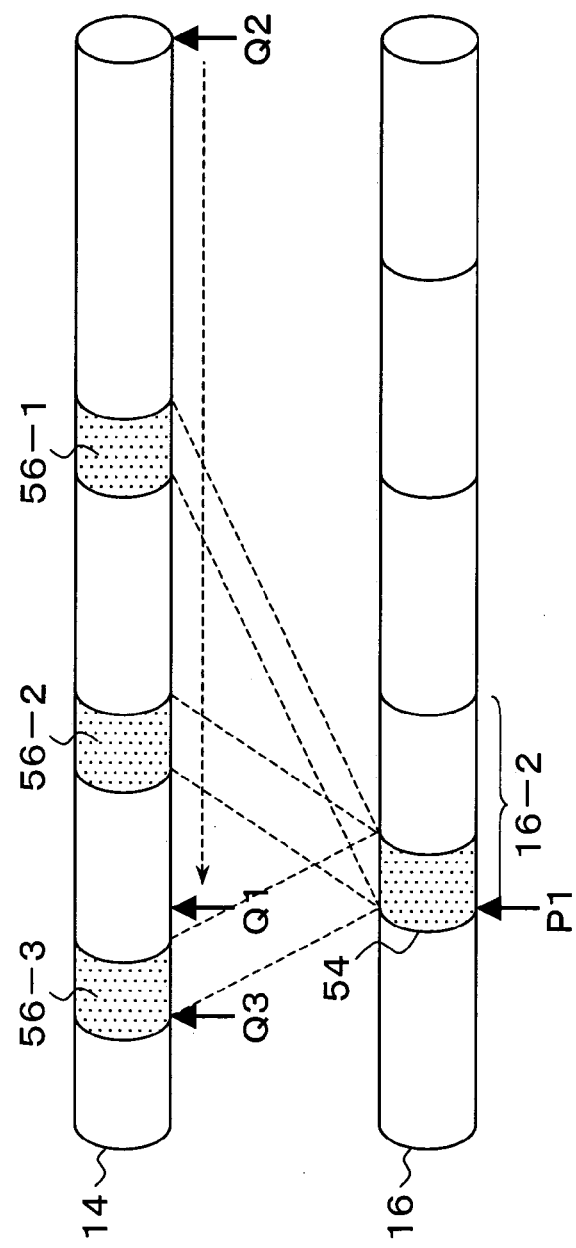
FIG. 3 is en explanatory diagram of difference extraction in the case where a plurality of matching parts are present in an old file.

FIG. 3 is the case that, for the data comparison target pointer P1 of the segment 16-2 which is the same as FIG. 2, when the matching search is executed by moving the data comparison reference pointer Q2 set on endmost of the old file 14 forward, multiple data rows 56-1, 56-2 and 56-3 are found as matches.

If multiple data rows 56-1 to 56-3 are found as matches like this, "duplicated code" which has the position of the data comparison reference pointer and the matching length of endmost data row 56-1 is output as the difference data.

On the other hand, if the matching part can not be found in the search for the matching part of the old file in FIG. 2 and FIG. 3, since the data of segment 16-2 is new updated data, "updated code" and new data is output as the difference data.

At this point, since the process which conducts the matching search for the new file 16 and the old file 14 for each segment is executed by shifting the data comparison reference pointer in increments of one (1) byte, one segment of the difference data will contain mixedly respective values, which have minimal width of one (1) byte, for the duplicated code based on the match with the old file and the updated code based on the mismatch with the old file.

More specifically describing the generation of the difference data in this way, for the base station 10 in FIGS. 1A and 1B, the segment cut-out unit 18 cuts out the updated new data in 256 KB unit from the new file 16, and in the data comparison unit 20, this is compared with the value of the starting position of the old file 14 located in corresponding position.

If the values of the segment starting position and the corresponding starting position in the old file are matched, the matching data row search unit 22 searches for the matching part of the old file as shown in FIG. 2 and FIG. 3 and outputs difference data which is "duplicated code" combined with the value of the data comparison reference pointer when the values are matched for the first time and the matching length to the difference data output unit 28.

On the other hand, if the data matched with the new data which is in the process target segment is not found in the old data, the duplicated code output unit 26 outputs the difference data which is combination of "updated code" and the new data to the difference data output unit 28.

The difference data output unit 28 receives a difference data transfer request from the embedded system such as the cell phone 12 which is connected via a transmitting line 30 and transfers the difference data for updating software stored in the sell phone. In the case of the base station 10 and the cell phone 12, this transmitting line 30 is a wireless line.

The cell phone 12 realized as the embedded system functions as the difference updating apparatus to which the difference updating method of the invention is applied. This cell phone 12 which functions as the difference updating apparatus comprises of a difference data reception unit 32, a nonvolatile memory 34, a restoration processing unit 36, a overwrite processing unit 38, a rewrite target memory 40 utilizing a nonvolatile memory and a work memory 42, as well as a resuming processing unit 44 which operates after power interruption is recovered. This resuming processing unit 44 is provided with functions of a decision unit 46, a restoration resume unit 48 and an overwriting resume unit 50.

The difference data reception unit 32 provided to the cell phone 12 requests the base station 10 to transfer the difference data of all the segments needed to update the data to be written stored in the rewrite target memory 40, receives the difference data of all the segments and stores it in the nonvolatile memory 34.

The restoration processing unit 36 stores in the nonvolatile memory 34 a restoration process segment number (X) indicating a current process segment, then restores segment data from relevant one (1) segment of the difference data and stores it in nonvolatile memory 34.

The overwrite processing unit 38 stores in the nonvolatile memory 34 an overwrite processing segment number (X−1) which indicates a process segment immediately preceding to the segment which is currently processed, then reads from the non volatile memory 34 the restoring segment data which is restored in the immediately preceding segment and overwrites it onto the data to be written in the rewrite target memory 40.

For the cell phone 12 in which the difference updating process of the invention is executed in this way, in the updating process for each segment based on the difference data, the restoration of new data from the difference data is separated from the overwriting process onto the data to be written of restored new data, and further, if the restoration process of any segment is completed, the overwriting of new data of that segment is not executed, and the overwriting of new data restored in the immediately preceding segment is executed.

Reason for separating the restoration process and the overwriting process as well as delaying the overwriting process by one (1) segment to the restoration process is allowing for resuming the process from the point of suspension by power interruption if the power supply to the cell phone 12 is interrupted during the difference updating process, and the updating process is suspended, and after that the power supply is recovered.

Further, since the restoration process and the overwriting process is temporally separated, timing of the power interruption may be one of two cases, which the power supply is interrupted during the restoration process or the power supply is interrupted during the overwriting process, and the difference updating process will be separately resumed in the resuming processing unit 40 for each case after the power supply is recovered.

Therefore, the decision unit 46 provided to the resuming processing unit 44 decides whether the power supply is interrupted during the restoration process of the segment data or the power supply is interrupted during the overwriting process of the segment data, after the power supply is recovered in the case of power interruption. In this decision of the decision unit 46, difference between the restoration process segment number and the overwrite processing segment number is calculated after the power supply is recovered in the case of power interruption, and if the difference is 1, it is decided that the power supply is interrupted during the restoration process, and if the difference is 2, it is decided that the power supply is interrupted during the overwriting process.

FIGS. 4A to 4E are explanatory diagrams of described status of the restoration process segment number and the overwrite processing segment number in the nonvolatile memory during the restoration process of segment data in the cell phone 12 of FIGS. 1A and 1B. FIG. 4A is the restoration process segment number y, and in the restoration process using the nonvolatile memory difference data SDi of FIG. 4B, (X) is described in the nonvolatile memory 34 as the restoration process segment number y in advance of the restoration. In this status, new data NDi is restored on work memory of FIG. 4C from the difference data SDi.

At this time, the overwrite processing segment number z of FIG. 4D is only a number (x−2) described about the last but one restored data NDi-2 in the nonvolatile memory restoration data shown by FIG. 4E, and a segment number about the last restored data NDi-1 is not described yet.

FIGS. 5A to 5E are explanatory diagrams of described status of the restoration process segment number and the overwrite processing segment number during storing into the nonvolatile memory after completion of restoration of new data NDi of FIGS. 4A to 4E. FIGS. 5A to 5E are in the status that the restoration of new data NDi is completed on the work memory of FIG. 5C by means of the nonvolatile memory difference data SDi of FIG. 5B, and when the restoration is completed, restored data NDi is stored in the nonvolatile memory as shown in FIG. 5E. In advance of the storage of the restored data NDi in the nonvolatile memory, as shown in FIG. 4D, the immediately preceding segment number (X−1) is described into the nonvolatile memory as the overwrite processing segment number z.

For these each status of FIGS. 4A to 4E and FIGS. 5A to 5E, the case in which the power supply is interrupted is assumed. First, it is assumed that the power supply is interrupted during the restoration of new data NDi as shown in FIGS. 4A to 4E. In this case, the restoration process segment number y described in the nonvolatile memory is y=x, and on the other hand, the overwrite processing segment number z is z=x−2. Therefore, difference between both (y−z) is calculated as follows:

$$(y-z)=x-(x-2)=2.$$

Thus, in the case where difference between the restoration process segment number y and the overwrite processing segment number z is 2, it is known that the power interruption has occurred during the restoration process.

On the other hand, as shown in FIGS. 5A to 5E, after writing the restored new data NDi into the nonvolatile memory, the immediately preceding segment number (X−1) is described into the overwriting segment number z, then overwriting of the restored data of the immediately preceding segment onto the rewrite target memory is executed, therefore, if the power supply is interrupted during the overwriting process, the restoration process segment number y of the nonvolatile memory is y=x, and on the other hand, the overwrite processing segment number z is z=x−1. Therefore, difference between the both is calculated as follows:

$$(y-z)=x-(X-1)=1,$$

and in the case where th difference is 1, it is decided that the power supply is interrupted during the overwriting process.

Referring again to FIGS. 1A and 1B, if it is decided by the decision unit 46 that the power supply is interrupted during the restoration process of the segment data, the restoration resume unit 48 provided to the resuming processing unit 44 of the cell phone 12 resumes the restoration process from the head of the segment of the restoration process segment number which is read from the nonvolatile memory 34, after the power supply is recovered.

Also, if it is decided by the decision unit 46 that the power supply is interrupted during the overwriting process of the segment data, the overwriting resume unit 50 resumes the overwriting process from the head of the overwrite processing segment number which is read from the nonvolatile memory 34, after the power supply is recovered.

With these functions of the resuming processing unit 44, if the power supply to the cell phone 12 is interrupted during the difference updating process based on the difference data and is recovered afterward, whether the power interruption occurs during the restoration process or during the overwriting process, it is possible to resume the process from each suspended segment position and continue the difference updating process after the power supply is recovered.

Also, in the restoration processing unit 36 of the difference updating process of the invention, after restoring new data for each segment by means of the difference data, it is decided that the data is identical to the data to be written of the rewrite target memory, i.e. old data, or not, and if it is identical, an old and new identical code is written onto the nonvolatile memory, and storage of new data is skipped, and only in the case where it is not identical, the process for writing the new data onto the nonvolatile memory is executed concurrently.

Figure 6B:
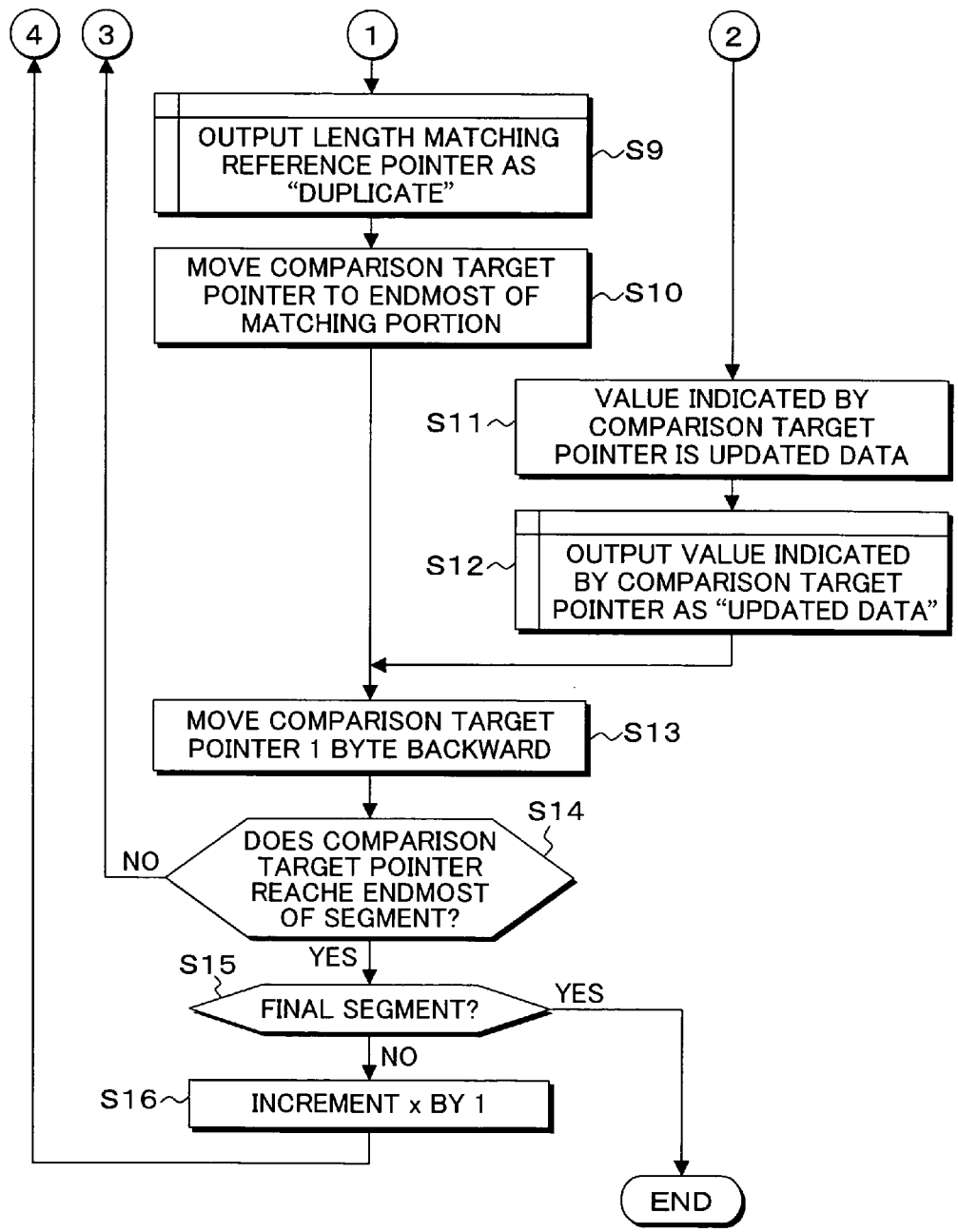
FIG. 6B is a flowchart of the difference data generating process continued from FIG. 6A.

FIGS. 6A and 6B are flowcharts of the difference data generating process in the base station 10 of FIGS. 1A and 1B. Here the size of one segment is assumed to be 256 KB.

S1: Read old file from a disk or the like.

S2: Read data which size is 256 KB from new file, and define as one (1) segment x (the xth segment).

S3: Set up a data comparison target pointer P at the head of the segment x, and a data reference pointer Q at the position corresponding to the head of the segment x.

S4: Compare a value indicated by the data comparison target pointer P and a value indicated by the data reference pointer Q.

S5: If values of S4 are identical, proceed to S8, otherwise proceed to S6.

S6: Search for matching part with the value indicated by the data comparison target pointer from endmost of the old file toward the position corresponding to the head of the segment (X−1).

S7: As a result of the search, if the matching data is found in the old file, proceed to S8. If not found, proceed to S11.

S8: Move the data comparison target pointer P and the data reference pointer Q from the position of each pointer backward in increments of one (1) byte, compare values thereof, and measure how many bytes matching of the values occurs for consecutively.

S9: When the values are no longer matching, output the value of the data reference pointer when the values matched for the first time and the matching length measured in S6 as "duplicated code" into the difference data.

S10: Move the data comparison target pointer P and the data reference pointer Q to the position of the last matching data, and proceed to S13.

S11: It is decided that this is the case that the matching data is not found in the old file in S7 and the value indicated by the data comparison target is newly appear d data with the update.

S12: Output an updated code and a value thereof (updated data) into the different data.

S13: Move the data comparison target pointer P one (1) byte backward.

S14: As a result of the movement of S13, if the data comparison target pointer P reaches to endmost of the segment x, proceed to S15, otherwise proceed to S4.

S15: If the segment x is the final segment of the new file, terminate the difference extracting process, otherwise proceed to S16.

S16: In order to make next segment into the reading target, increment x by 1 and back to S2.

Figure 7A:
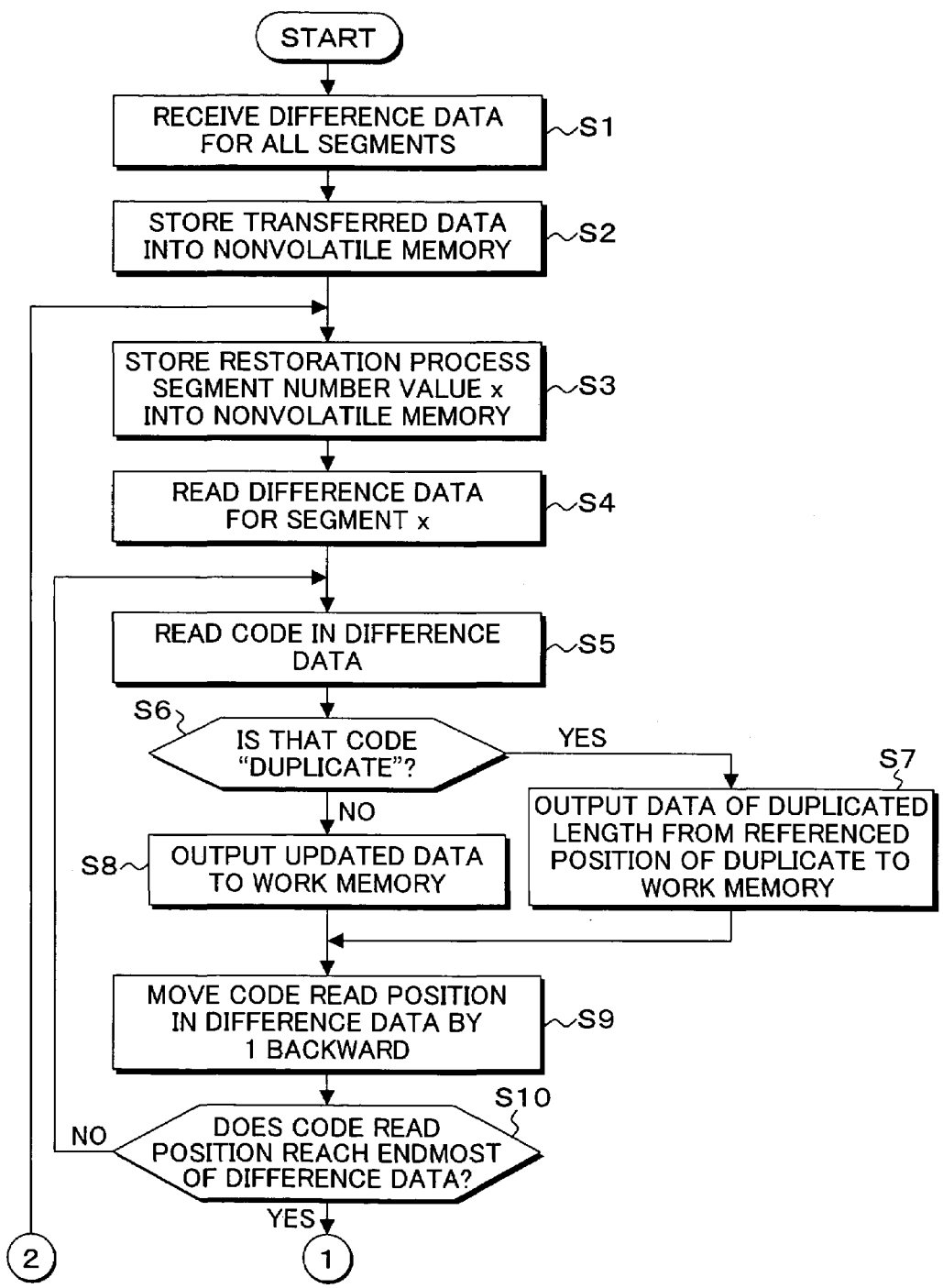
FIG. 7A is a flowchart of the data updating process according to the first embodiment of the invention, executed in the cell phone of FIGS. 1A and 1B.
Figure 7B:
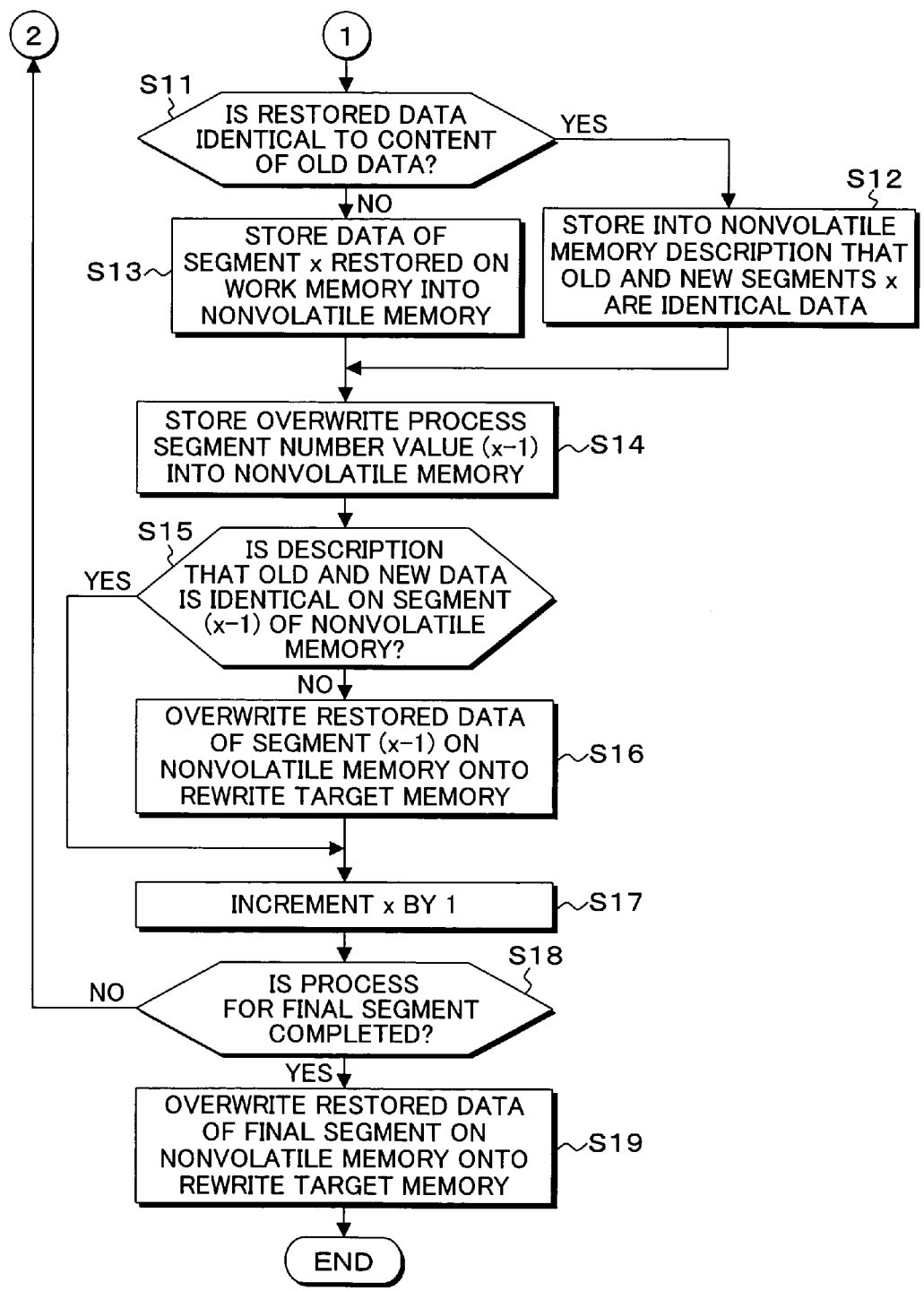
FIG. 7B is a flowchart of the data updating process continued from FIG. 7A.

FIGS. 7A and 7B are flowcharts of the data updating process in the cell phone 12 of FIGS. 1A and 1B. Here the default value of x is assumed to be 1.

S1: Have the difference data for all segments transferred from outside and receive it.

S2: Store the received difference data into the-nonvolatile memory.

S3: Describe the value x into the nonvolatile memory as the restoration process segment number.

S4: Read the difference data for the segment x from the nonvolatile memory.

S5: Read one (1) code from the transferred difference data.

S6: If the code read in S5 is "duplicated code", proceed to S7, or is "updated code", proceed to S8.

S7: From the reference position indicated by "duplicated code", Output data of duplicated length indicated by "duplicated code" into the work memory, and proceed to S9.

S8: Output the updated data indicated by "updated code" into the work memory.

S9: Move the code reading position in the difference data backward for one (1) position.

S10: If the code reading position in the difference data is endmost of the difference data, proceed to S11, otherwise back to S5.

S11: Compare new data of the segment x restored on the work memory with old data of the segment x on the rewrite target memory, and if these are identical, proceed to S12, otherwise proceed to S13.

S12: Write into the nonvolatile memory the old and new identical code which indicates that old and new data of the segment x is identical, and proceed to S14.

S13: Store new data of the segment x restored on the work memory into the nonvolatile memory.

S14: Describe the value (X−1) into the nonvolatile memory as the overwrite processing segment number.

S15: Read the content of the nonvolatile memory which stores data of the segment (X−1), and if the old and new identical code is described, proceed to S17, otherwise proceed to S16.

S16: Overwrite new data of the segment (X−1) restored on the nonvolatile memory onto the segment (X−1) of old data stored in the internal memory.

S17: In order to make next segment into the reading target, increment x by 1.

S18: If restoration of all the segments is completed, proceed to S19, otherwise back to S3.

S19: Overwrite new data of the final segment restored on the nonvolatile memory onto the final segment of old data stored in the internal memory.

In this data updating process, by storing the difference data of all the segments into the nonvolatile memory first with the processes of step S1 and S2, a problem that the difference data can not be received from outside because of the power interruption during the updating process is resolved. Also, with the description of the restoration process segment number into the nonvolatile memory in step S3 and the description of the overwrite processing segment number into the nonvolatile memory in step S14, if the updating process is suspended by the power interruption, it will be possible to resume the updating process from the segment in the middle after the power supply is recovered.

Further, with the storage of new data of the segment restored in step S13 into the nonvolatile memory, a problem that the new data of the restored segment is lost by the power interruption is resolved. Also, with the processes of step S11 and S12, by comparing the restored new data with the old data, and if these are identical, by writing into the nonvolatile memory the old and new identical code and omitting to write the restored new data, increase of processing time with the overwriting process will be prevented.

Figure 8A:
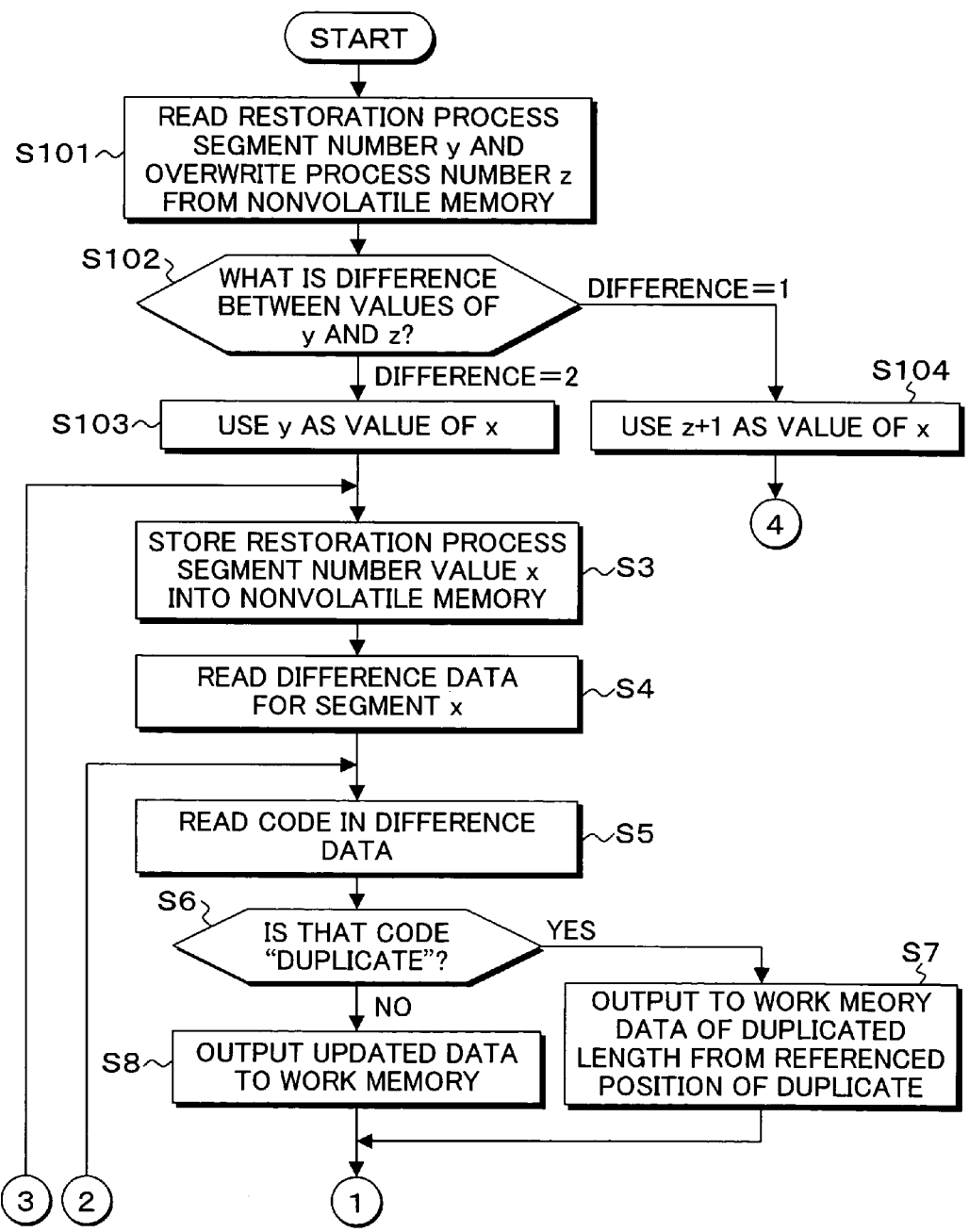
FIGS. 8A and 8B are flowcharts of data updating process according to the first embodiment of the invention, executed after power supply interrupted during updating of data is recovered.
Figure 8B:
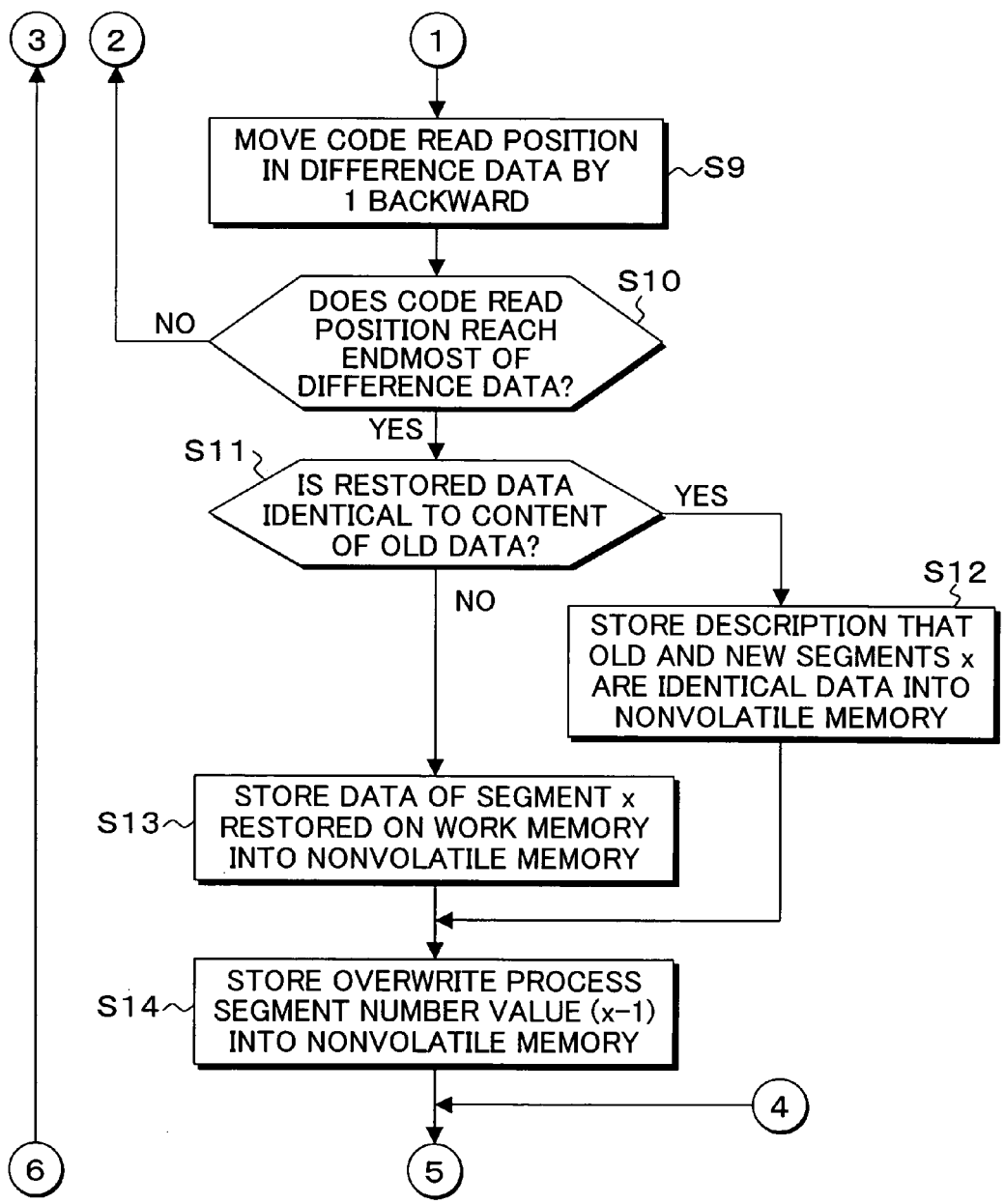
Figure 8C:
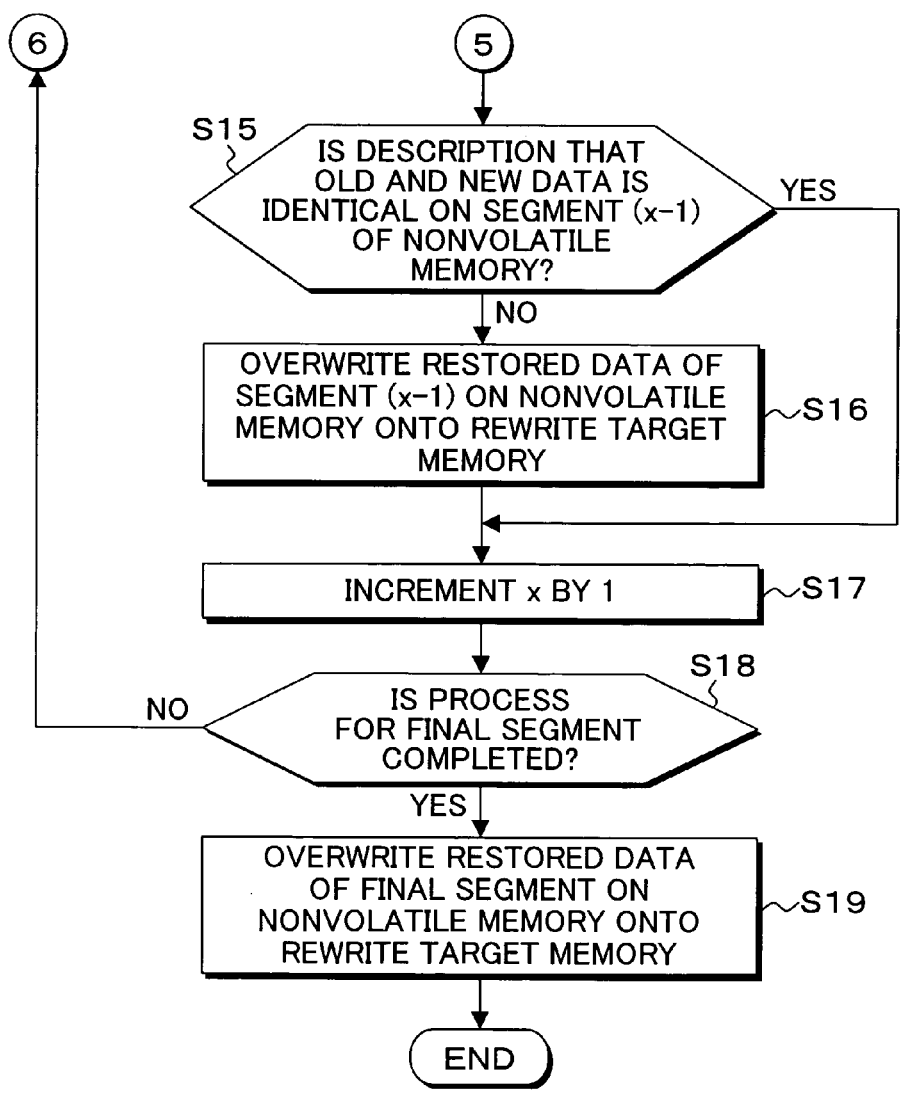
FIG. 8C is a flowchart of data updating process continued from FIGS. 8A and 8B.

FIGS. 8A to 8C are flowcharts of the process for resuming the updating process from the middle after the power supply is recovered, when the power supply is interrupted during the data updating process in the cell phone 12 in FIGS. 1A and 1B. This process is the one in which processes of steps S1 and S2 in FIG. 7A are automatically converted to the processes of step S101 to S104, and step S3 to S19 is same as the data updating process of FIGS. 7A and 7B.

S101: Read the restoration process segment number y and the overwrite processing segment number z from the nonvolatile memory.

S102: If the difference between the restoration process segment number and the overwrite processing segment number is 1, decide that the power supply was interrupted during the overwriting process and proceed to s104, or if the difference is 2, decide that the power supply was interrupted during the restoration process and proceed to s103.

S103: Suppose that x=y, and proceed to S3.

S104: Suppose that x=z+1, and proceed to S15.

S3: Describe the value x into the nonvolatile memory as the restoration process segment number.

S4: Read the difference data for the segment x from the nonvolatile memory.

S5: Read one (1) code from the transferred difference data.

S6: If the code read in S5 is "duplicated code", proceed to S7, or is "updated code", proceed to S8.

S7: From the reference position indicated by "duplicated code", Output data of duplicated length indicated by "duplicated code" into the work memory, and proceed to S9.

S8: Output the updated data indicated by "updated code" into the work memory.

S9: Move the code reading position in the difference data backward for one (1) position.

S10: If the code reading position in the difference data is endmost of the difference data, proceed to S11, otherwise back to S5.

S11: Compare new data of the segment x restored on the work memory with old data of the segment x on the rewrite target memory, and if these are identical, proceed to S12, otherwise proceed to S13.

S12: Write into the nonvolatile memory the old and new identical code which indicates that old and new data of the segment x is identical, and proceed to S14.

S13: Store new data of the segment x restored on the work memory into the nonvolatile memory.

S14: Describe the value (X−1) into the nonvolatile memory as the overwrite processing segment number.

S15: Read the content of the nonvolatile memory which stores data of the segment (X−1), and if the old and new identical code is described, proceed to S17, otherwise proceed to S16.

S16: Overwrite new data of the segment (X−1) restored on the nonvolatile memory onto the segment (X−1) of old data stored in the internal memory.

S17: In order to make next segment into the reading target, increment x by 1.

S18: If restoration of all the segments is completed, proceed to S19, otherwise back to S3.

S19: Overwrite new data of the final segment restored on the nonvolatile memory onto the final segment of old data stored in the internal memory.

In this updating process resumed after the power supply is recovered, it will be possible to decide that whether the process resuming position after the power recovery is the restoration process or the overwriting process and to continue the data updating process, with the processes of step S101 to S104.

Figure 9A:
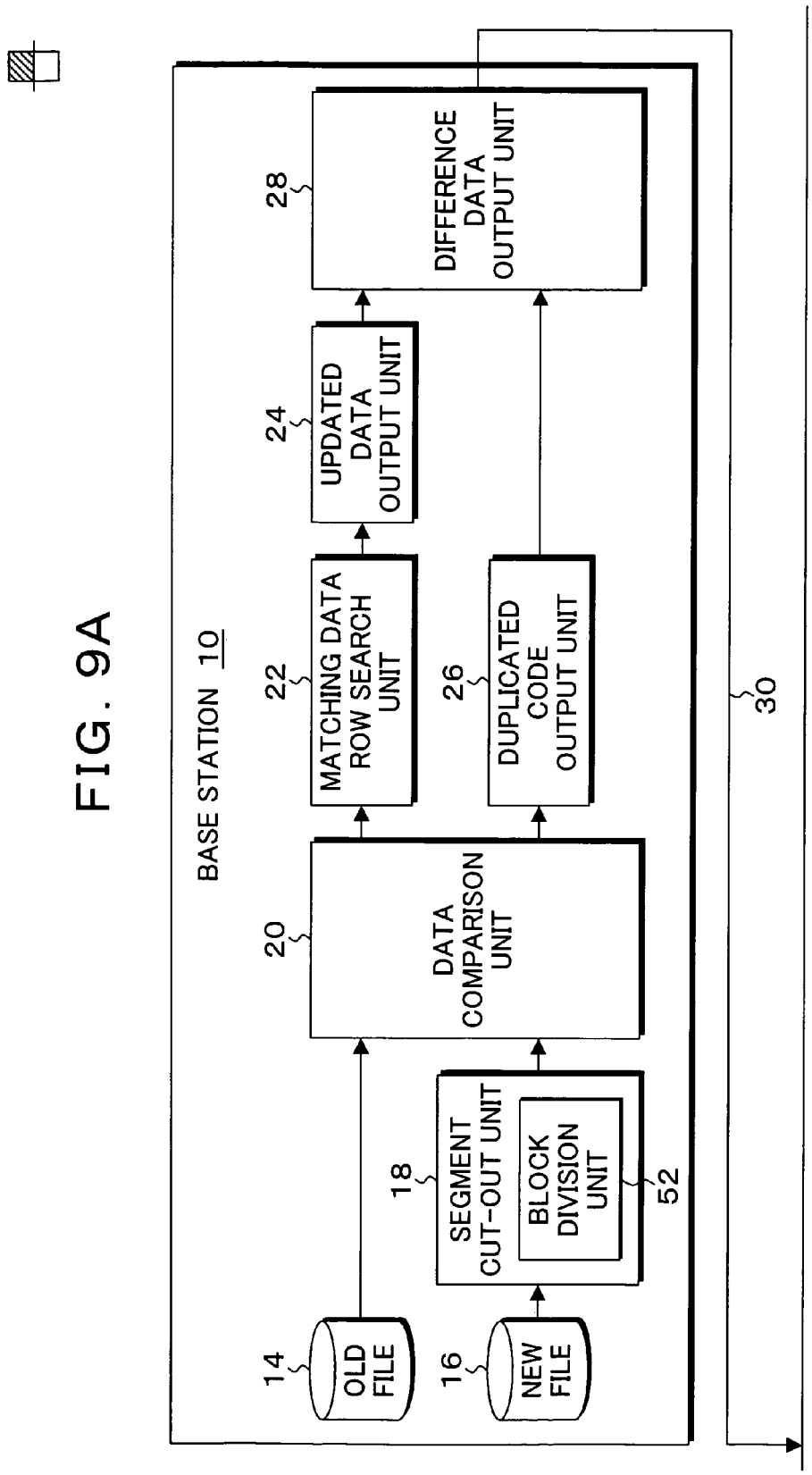
FIGS. 9A and 9B are block diagrams of a second embodiment according to the invention.
Figure 9B:
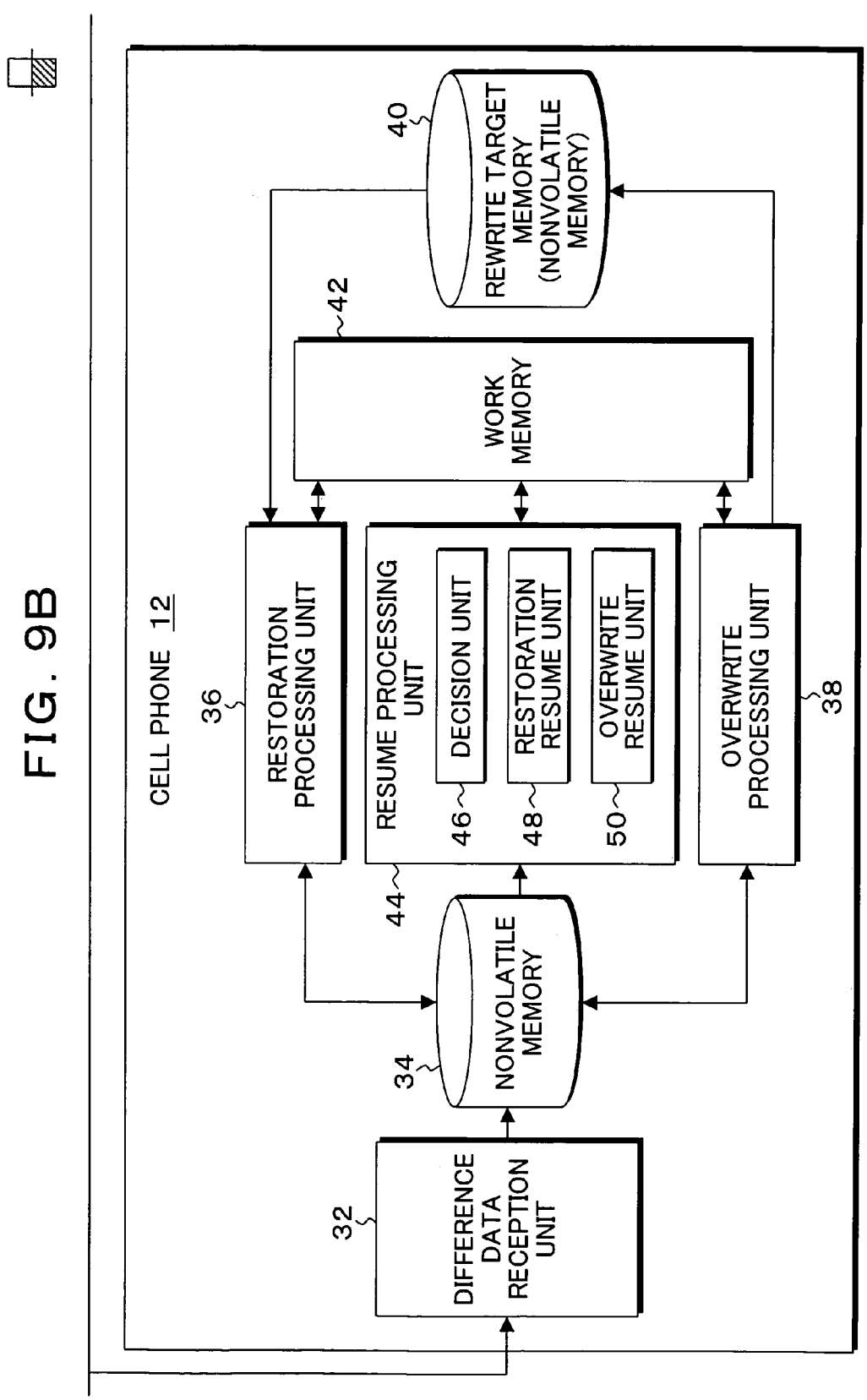

FIGS. 9A and 9B are block diagrams to which a second embodiment of the difference updating method of the invention is applied. This embodiment is characterized in that, in the difference data generating process on the base station 10 side, the data of constant size, for example 256 KB, cut out from the new file 16 by the segment cut-out unit 18 is further divided into n block data by a block division unit 52 and it is arranged such that the difference data is generated from the process for each block.

Corresponding to the generation of the difference data on the base station 10 side, which corresponds to the block data wherein one (1) segment is divided into n blocks, also in the restoration processing unit 36 on the cell phone 12 side, for the restoration process by means of the difference data for each segment, it is arranged such that the restoration of new data is executed based on the difference block data which is divided into n pieces. It is noted that other structures are the same as the first embodiment in FIGS. 1A and 1B.

Figure 10B:
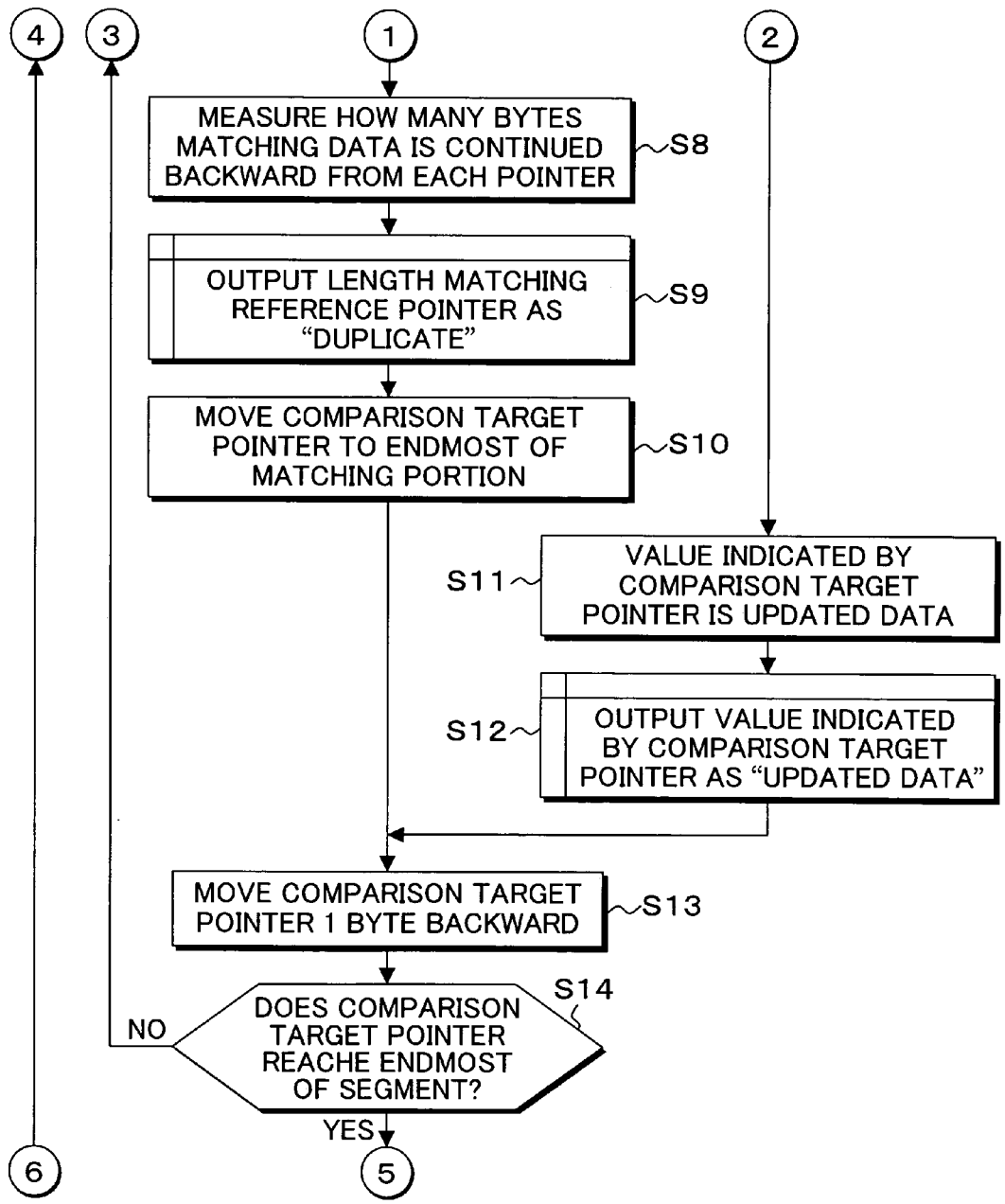
FIGS. 10B and 10C are flowcharts of the difference data generating process continued from FIG. 10A.
Figure 10C:
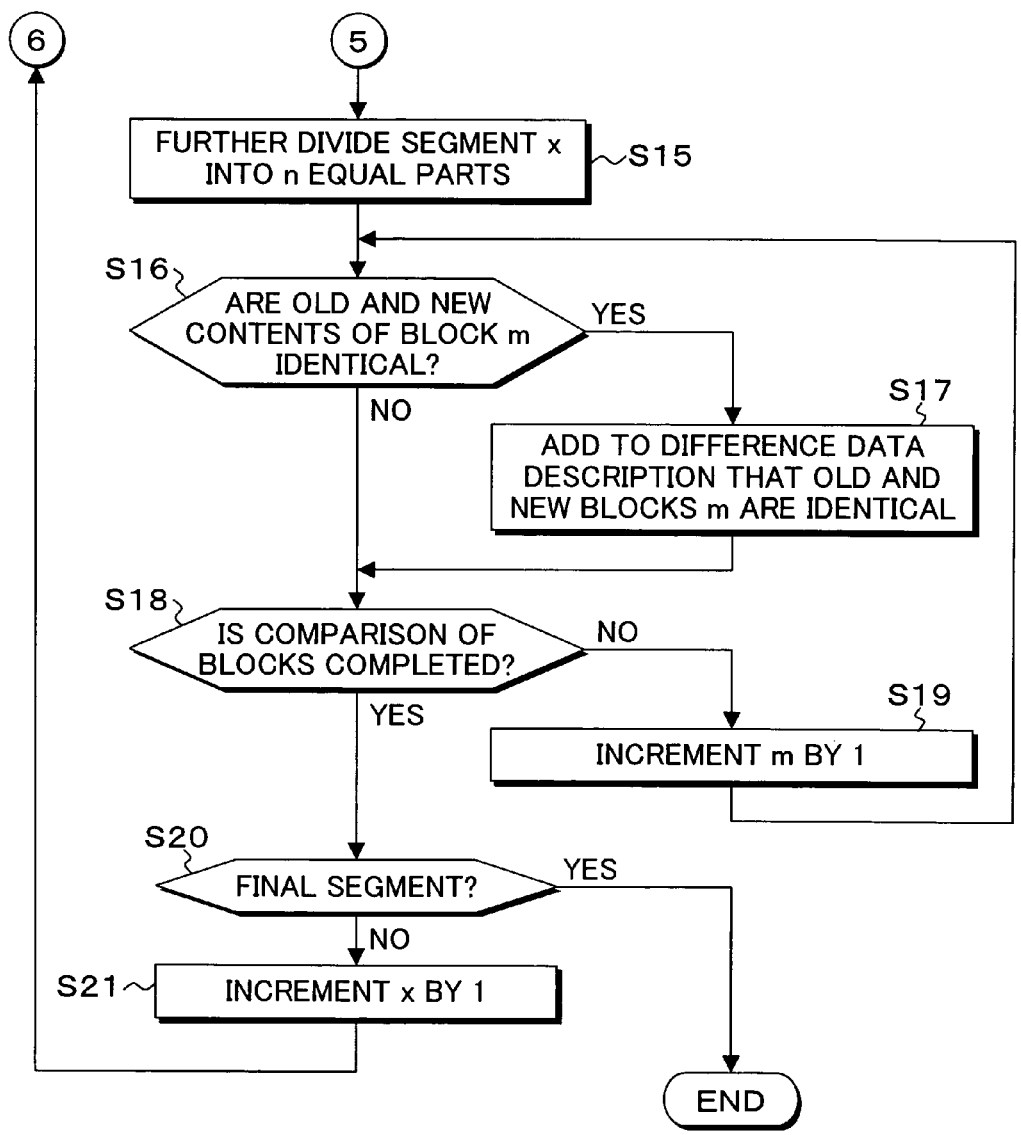

FIGS. 10A to 10C are flowcharts of the difference data generating process in the base station 10 of FIGS. 9A and 9B. It is noted that the size of one segment is assumed to be 256 KB in this process.

S1: Read old file from a disk or the like.

S2: Read data which size is 256 KB from new file, and define as one (1) segment x (the xth segment).

S3: Set up a data comparison target pointer P at the head of the segment x, and a data reference pointer Q at the position corresponding to the head of the segment x.

S4: Compare a value indicated by the data comparison target pointer P and a value indicated by the data reference pointer Q.

S5: If values of S4 are identical, proceed to S8, otherwise proceed to S6.

S6: Search for matching part with the value indicated by the data comparison target pointer from endmost of the old file toward the position corresponding to the head of the segment (X−1).

S7: As a result of the search, if the matching data is found in the old file, proceed to S8. If not found, proceed to S11.

S8: Move the data comparison target pointer P and the data reference pointer Q from the position of each pointer backward in increments of one (1) byte, compare values thereof, and measure how many bytes matching of the values occurs for consecutively.

S9: When the values are no longer matching, output the value of the data reference pointer when the values matched for the first time and the matching length measured in S6 as "duplicated code" into the difference data.

S10: Move the data comparison target pointer P to the position of the last matching data for the data reference pointer Q, and proceed to S13.

S11: It is decided that this is the case that the matching data is not found in the old file and the value indicated by the data comparison target is newly appeared data with the update.

S12: Output an "updated code" and a value thereof (updated data) into the difference data.

S13: Move the data comparison target pointer P one (1) byte backward.

S14: As a result of the movement of S13, if the pointer reaches to endmost of the segment x, proceed to S15, otherwise proceed to S4.

S15: Equally divide the segment x into n blocks.

S16: Compare the contents of old and new data in the m-th block, and if old and new data is identical, proceed to S17, otherwise proceed to S18.

S17: Add the old and new identical code, which indicates that the contents of the old and new m-th blocks are identical, to the difference data for the segment x.

S18: If the m-th block is the final block of the segment x, proceed to S20, otherwise proceed to S19.

S19: Increment the value of m by 1 and back to S16.

S20: If the segment x is the final segment of the new file, terminate the difference extracting process, otherwise proceed to S21.

S21: In order to make next segment into the reading target, increment x by 1 and back to S2.

In this difference data generating process, with steps S1 to S19, by comparing the block data wherein each segment is divided into n pieces with the block data of old file and adding the old and new identical code to the difference data if these are identical, it is possible to omit the process for comparing old data with new data restored by block unit in the updating process on the cell phone 12 side which is to be the embedded system and to reduce the time of the updating process correspondingly.

Figure 11B:
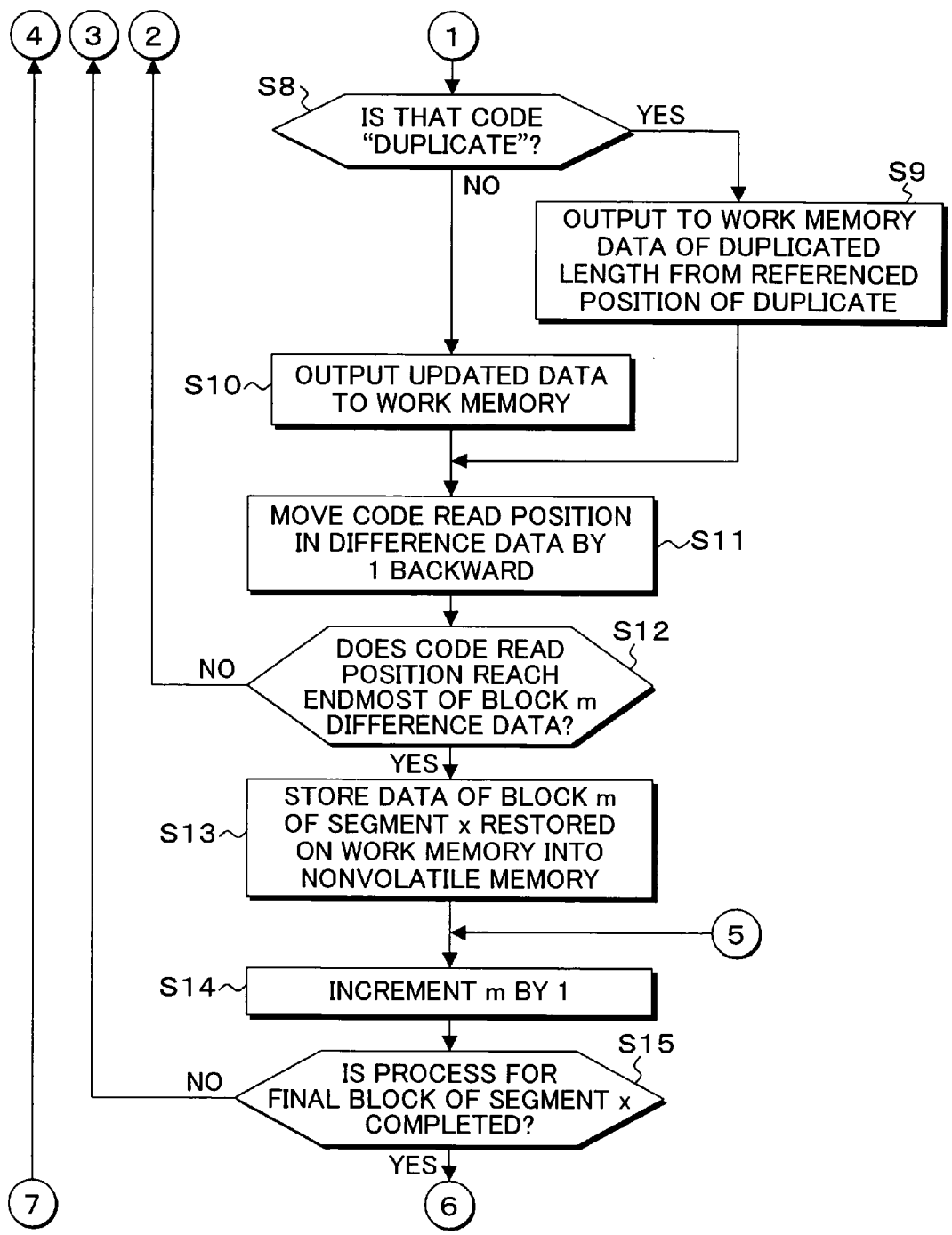
FIGS. 11B and 11C are flowcharts of the data updating process continued from FIG. 11A.
Figure 11C:
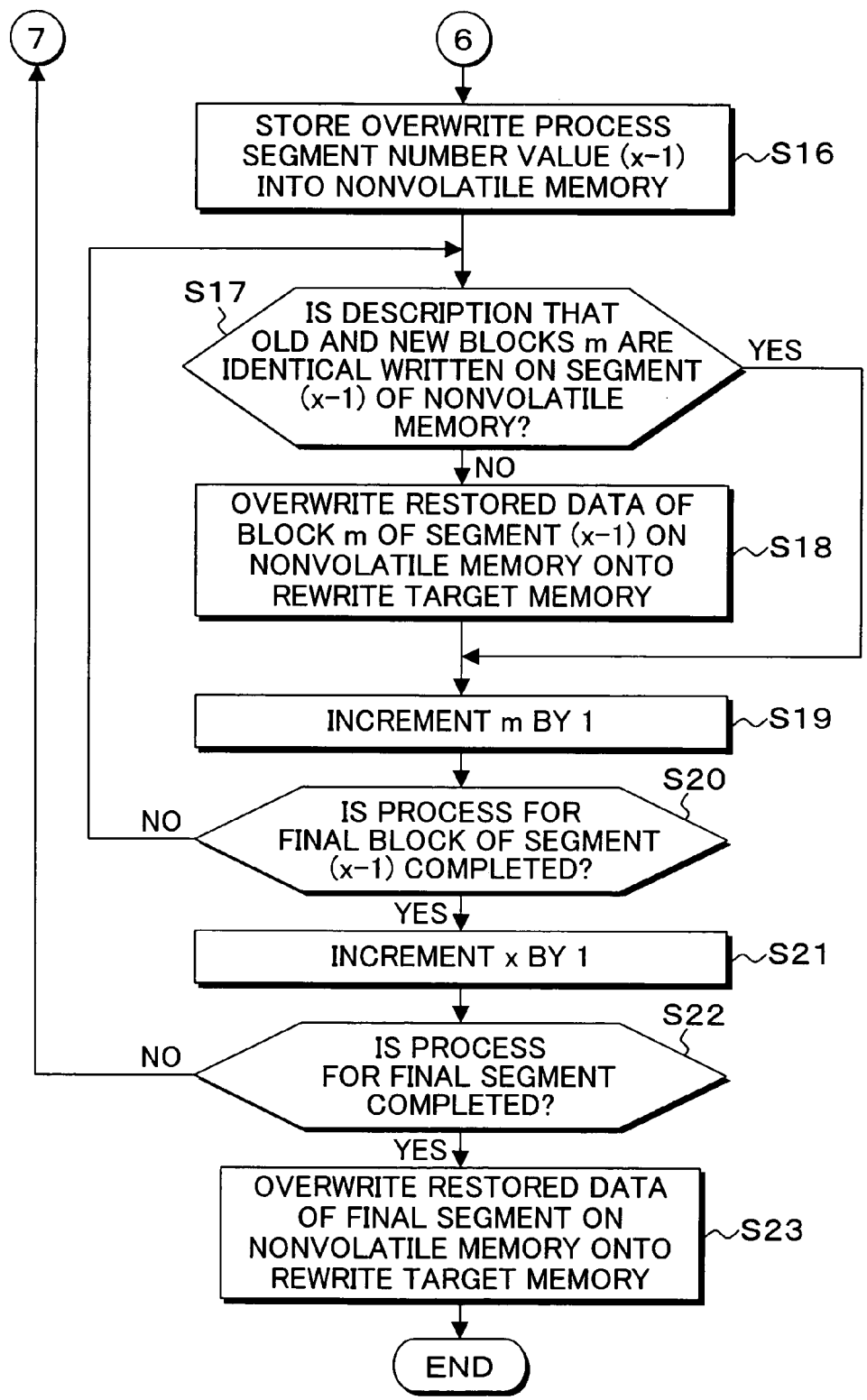

FIGS. 11A to 11C are flowcharts of the data updating process in the cell phone of FIGS. 9A and 9B. It is noted that the default value of x is assumed to be 1.

S1: transfer the difference data for all segments from outside and receive it.

S2: Store the received difference data into the nonvolatile memory.

S3: Describe the value x into the nonvolatile memory as the restoration process segment number.

S4: If the old and new identical code, which indicates that old and new block m is identical, is added to the difference data for the segment x, proceed to S5, otherwise proceed to S6.

S5: Write and store into the nonvolatile memory the old and new identical code which indicates that old and new block m of the segment x is identical, and proceed to S14.

S6: Read the difference data for the block m of the segment x from the nonvolatile memory.

S7: Read one (1) code from the transferred difference data.

S8: If the code read in S7 is "duplicated code", proceed to S9, or is "updated code", proceed to S10.

S9: From the reference position indicated by "duplicated code", Output data of duplicated length indicated by "duplicated code" into the work memory, and proceed to S11.

S10: Output the updated data indicated by "updated code" into the work memory.

S11: Move the cod reading position in the difference data backward for one (1) position.

S12: If the code reading position in the difference data is endmost of the difference data of the block m, proceed to S13, otherwise back to S7.

S13: Store the data of the block m of the segment x restored on the work memory into the nonvolatile memory.

S14: Increment the value of m by 1.

S15: If the process is completed through the final block of the segment x, proceed to S16, otherwise back to S4.

S16: Describe the value (X-1) into the nonvolatile memory as the overwrite processing segment number.

S17: Read the content of the nonvolatile memory which stores data of the segment (X-1), and if the old and new identical code, which indicates that old and new data is identical for block m, is described, proceed to S19, otherwise proceed to S18.

S18: Overwrite new data of the block m of the segment (X-1) restored on the nonvolatile memory onto the block m of the segment (X-1) of old data stored in the internal memory.

S19: Increment th value of m by 1.

S20: If all the overwriting process is completed through the final block of the segment (X-1), proceed to S21, otherwise proceed to S17.

S21: In order to make next segment into the reading target, increment x by 1.

S22: If restoration of all the segments is completed, proceed to S23, otherwise back to S3.

S23: Overwrite new data of the final segment restored on the nonvolatile memory onto the final segment of old data stored in the internal memory.

In this data updating process in the cell phone 12, by storing the difference data of all the segments into the nonvolatile memory first with the processes of step S1 and S2, a problem that the difference data can never be received from outside because of the power interruption during the updating process is resolved.

Also, with the description of the restoration process segment number into the nonvolatile memory in step S3 and the description of the overwrite processing segment number into the nonvolatile memory in step S16, if the updating process is suspended by the power interruption, it is possible to resume the updating process from the segment in the middle after the power supply is recovered.

Further, with the writing of the block data of the segment restored in step S13 into the nonvolatile memory, a problem that the restored block data is lost by the power interruption is resolved. Also, by skipping the writing into the nonvolatile memory when the old and new identical code is present in step 4 as well as skipping the overwriting onto the write target data when the old and new identical code is described in step 17, increase of processing time with the overwriting process can be prevented.

Figure 12A:
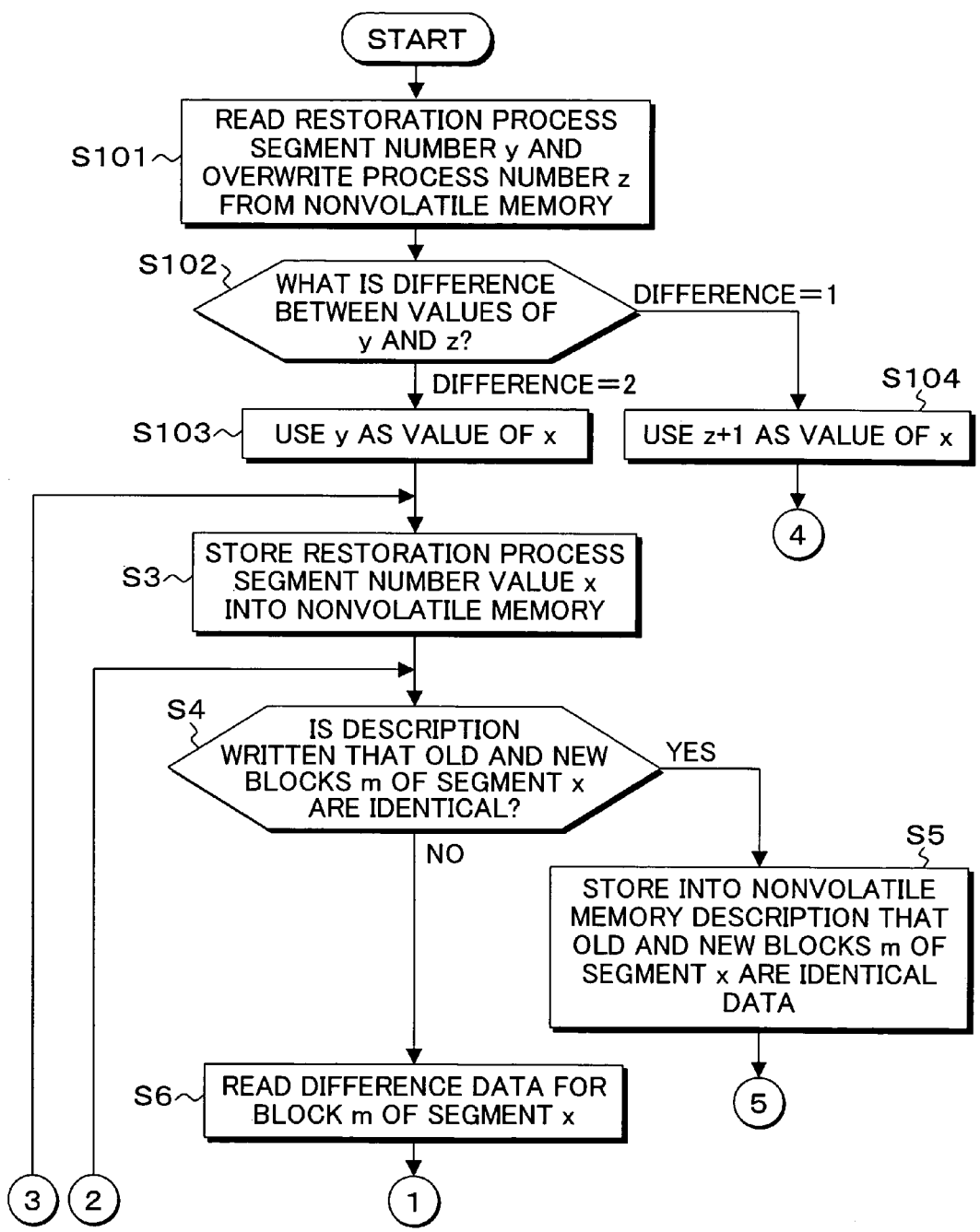
FIG. 12A is a flowchart of the data updating process according to the second embodiment of the invention, executed after power supply interrupted during updating of data is recovered.
Figure 12B:
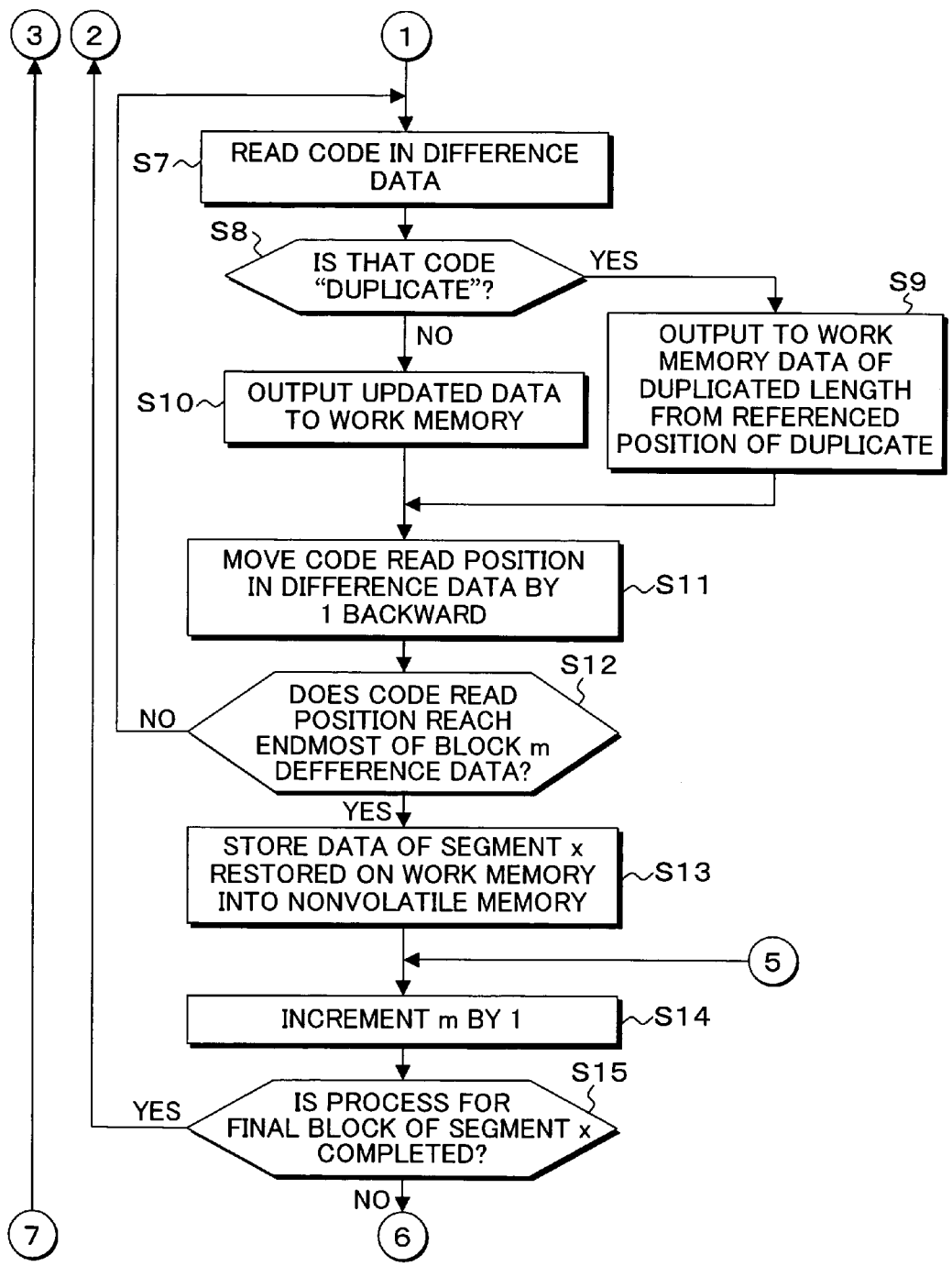
FIGS. 12B and 12C are flowcharts of the data updating process continued from FIG. 12A.
Figure 12C:
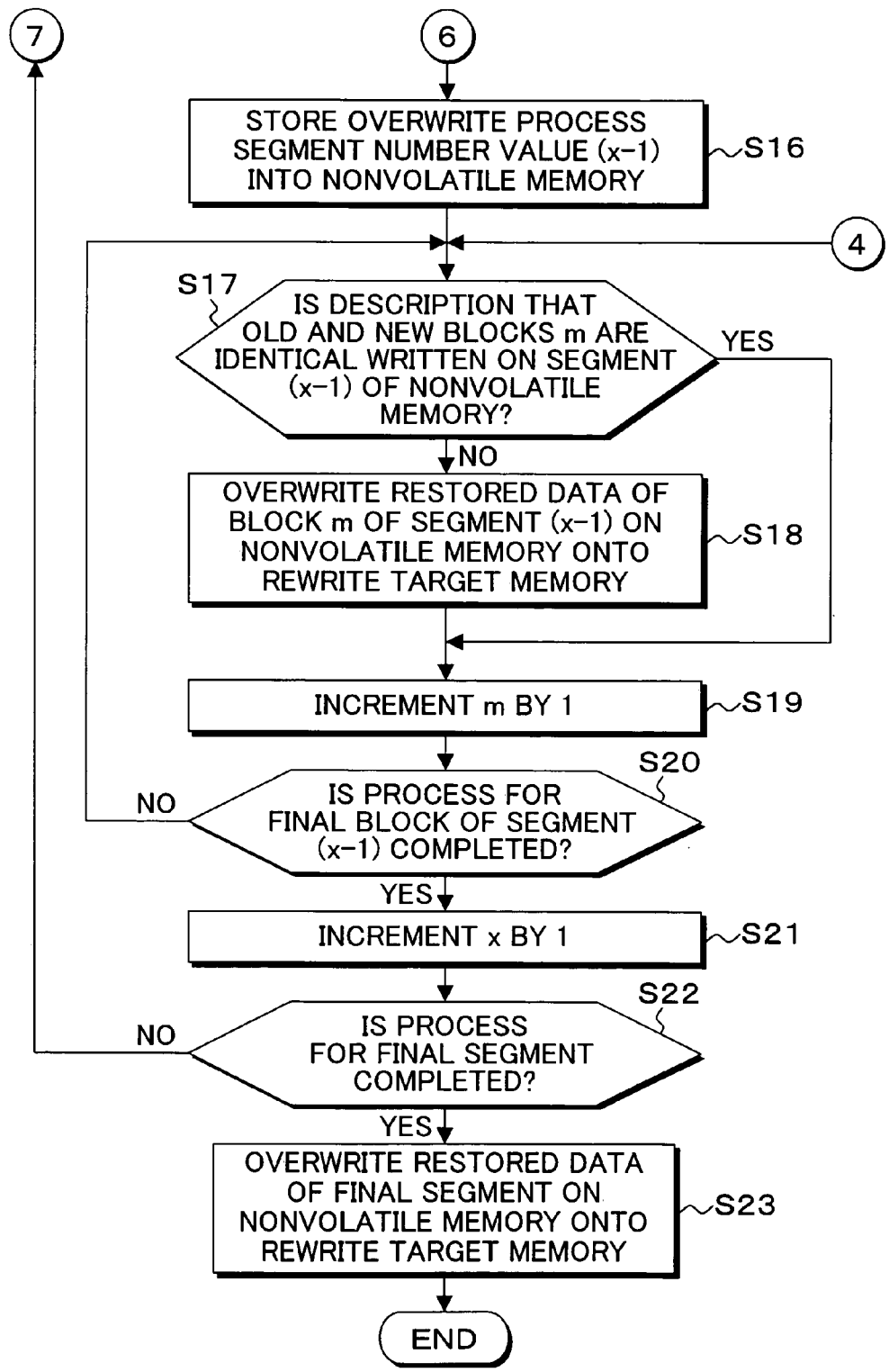

FIGS. 12A to 12C are flowcharts in the case where the updating process is resumed from the middle after the power supply is recovered, when the power supply is interrupted during the data updating process in the cell phone 12 in FIGS. 9A and 9B. This process is the one in which processes of steps S1 and S2 in FIG. 8C are automatically converted to the processes of step S101 to S104, and step S3 to S23 is same as the data updating process of FIG. 8C.

S101: Read the restoration process segment number y and the overwrite processing segment number z from the nonvolatile memory.

S102: If the difference between the restoration process segment number y and the overwrite processing segment number z is 1, decide that the power supply was interrupted during the overwriting process and proceed to s104, or if the difference is 2, decide that th power supply was interrupted during the restoration process and proceed to s103.

S103: Proceed to S3 with x=y.

S104: Proceed to S17 with x=z+1.

S3: Describe the value x into the nonvolatile memory as the restoration process segment number.

S4: If the old and new identical code, which indicates that old and new block m is identical, is added to the difference data for the segment x, proceed to S5, otherwise proceed to S6.

S5: Write and store into the nonvolatile memory the old and new identical code which indicates that old and new block m of the segment x is identical, and proceed to S14.

S6: Read the difference data for the block m of the segment x from the nonvolatile memory.

S7: Read one (1) code from the transferred difference data.

S8: If the code read in S7 is "duplicated code", proceed to S9, or is "updated code", proceed to S10.

S9: From the reference position indicated by "duplicated code", Output data of duplicated length indicated by "duplicated code" into the work memory, and proceed to S11.

S10: Output the updated data indicated by "updated code" into the work memory.

S11: Move the code reading position in the difference data backward for one (1) position.

S12: If the code reading position in the difference data is endmost of the difference data of the block m, proceed to S13, otherwise back to S7.

S13: Store the data of the block m of the segment x restored on the work memory into the nonvolatile memory.

S14: Increment the value of m by 1.

S15: If the process is completed through the final block of the segment x, proceed to S16, otherwise back to S4.

S16: Describe the value (X−1) into the nonvolatile memory as the overwrite processing segment number.

S17: Read the content of the nonvolatile memory which stores data of the segment (X−1), and if the old and new identical code, which indicates that old and new data is identical for block m, is described, proceed to S19, otherwise proceed to S18.

S18: Overwrite new data of the block m of the segment (X−1) restored on the nonvolatile memory onto the block m of the segment (X−1) of old data stored in the internal memory.

S19: Increment the value of m by 1.

S20: If all the overwriting process is completed through the final block of the segment (X−1), proceed to S21, otherwise proceed to S17.

S21: In order to make next segment into the reading target, increment x by 1.

S22: If restoration of all the segments is completed, proceed to S23, otherwise back to S3.

S23: Overwrite new data of the final segment restored on the nonvolatile memory onto the final segment of old data stored in the internal memory.

In this updating process after the power supply is recovered, it will be possible to decide that whether the process resuming position after the power recovery is the updating process or the overwriting process and to continue the data updating process, with the processes of step S101 to S104.

Figure 13A:
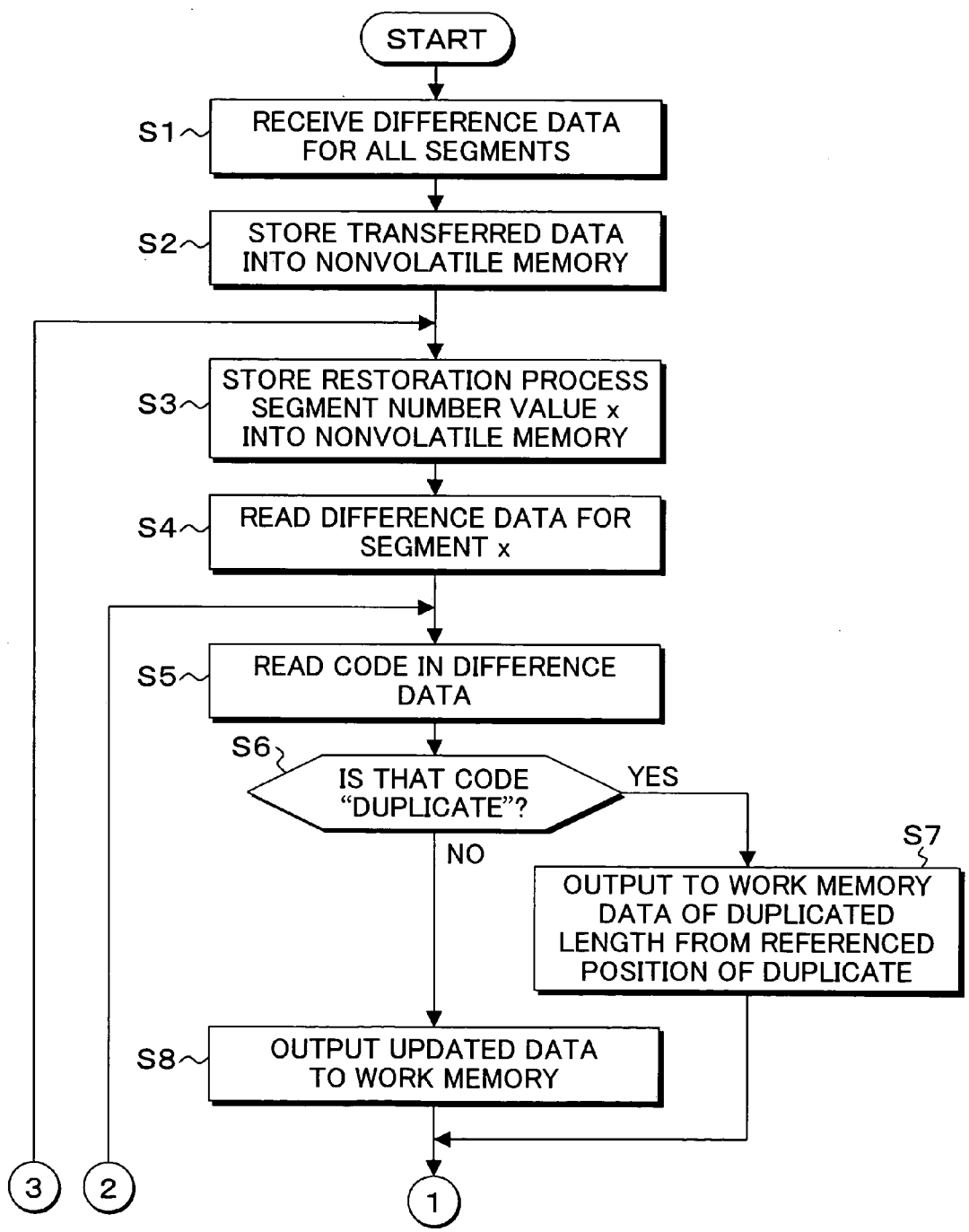
FIG. 13A is a flowchart of the data updating process according to a third embodiment of the invention, executed in the cell phone.
Figure 13B:
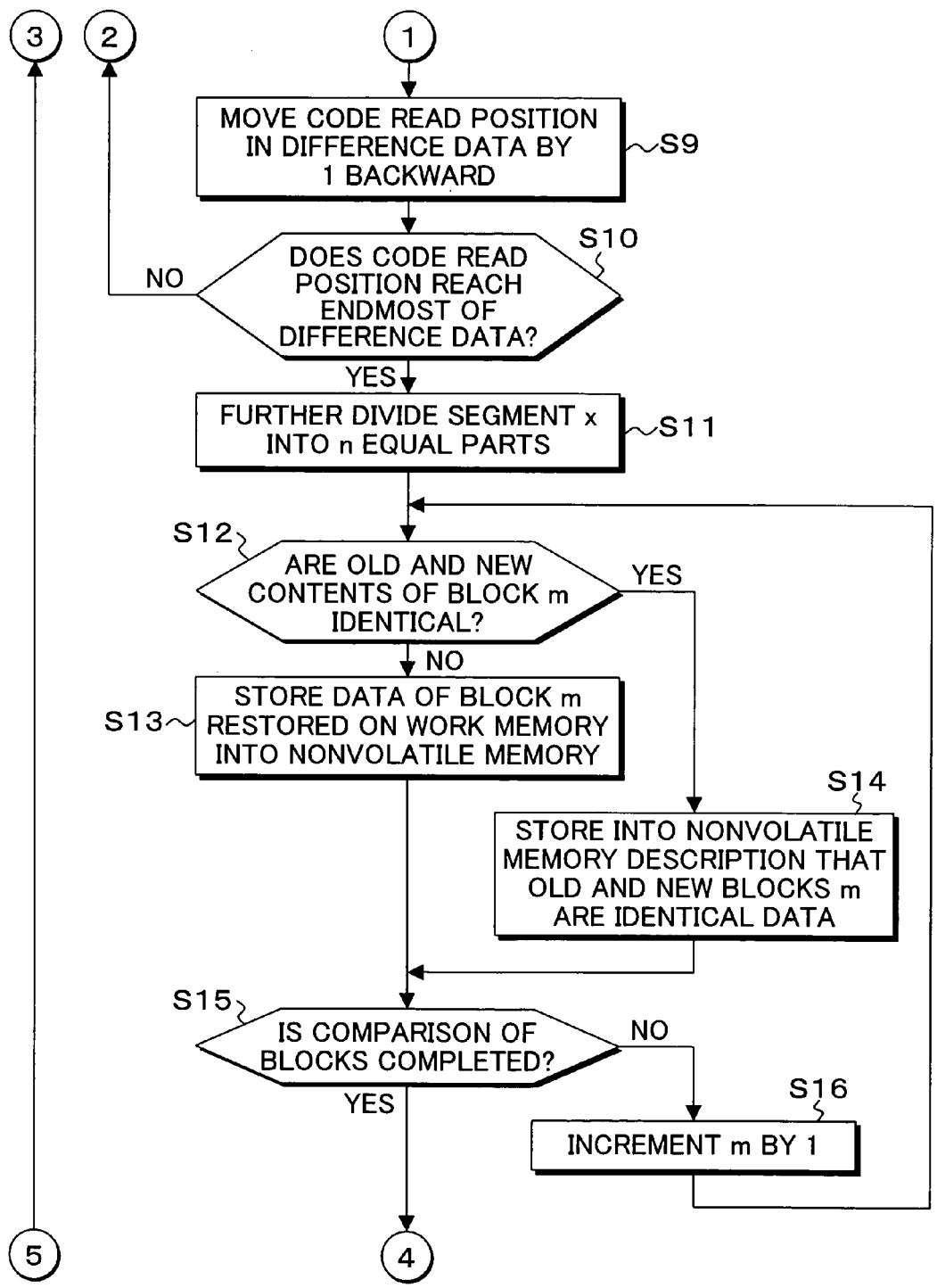
FIGS. 13B and 13C are flowcharts of the data updating process continued from FIG. 13A.
Figure 13C:
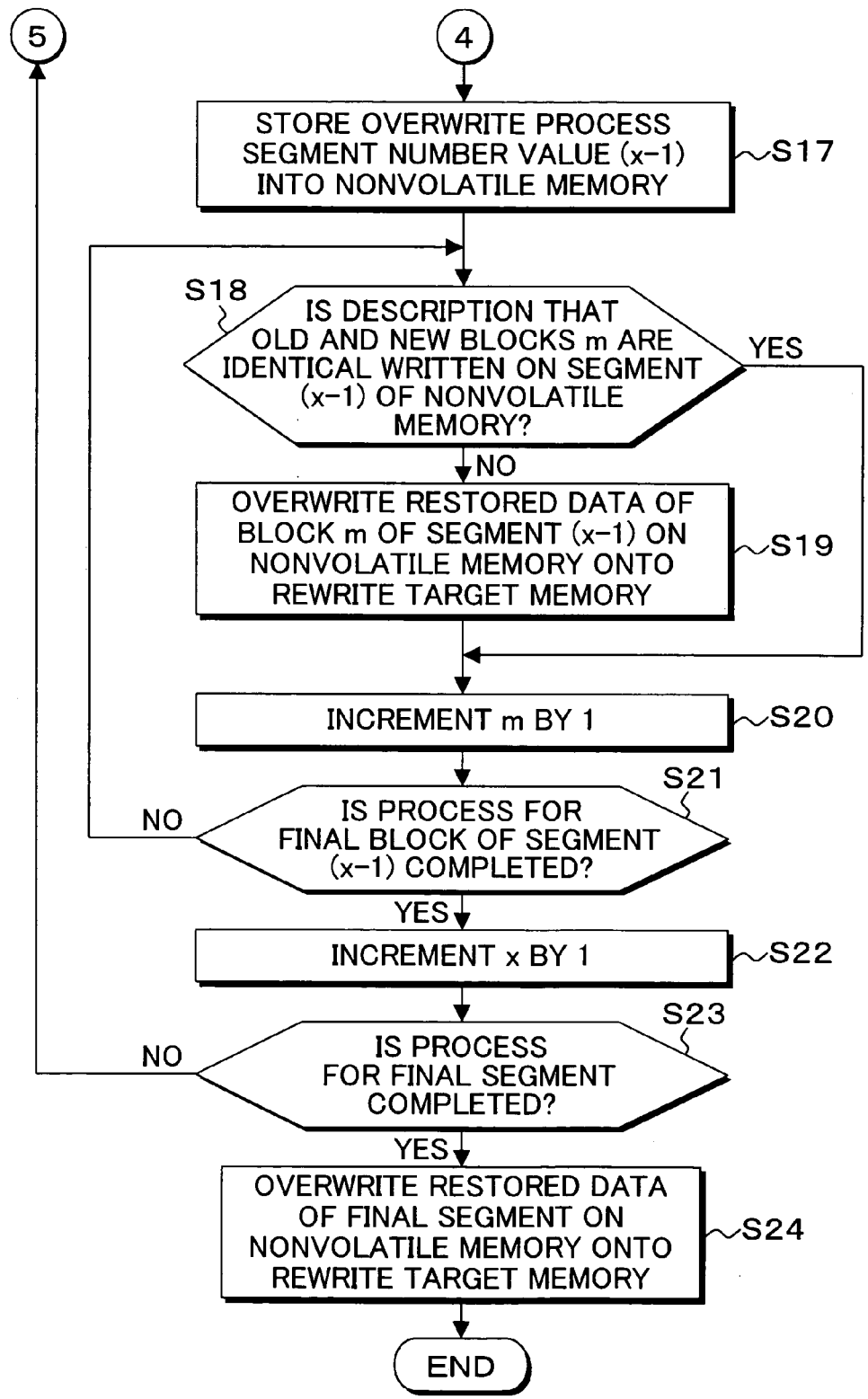

FIGS. 13A to 13C are flowcharts of other embodiment of the data updating process in the cell phone 12 of FIGS. 1A and 1B, and this embodiment is characterize in that when the data restoration process for one (1) segment is completed, it is divided into n blocks, then each block is compared whether old and new data is identical or not, and if data is identical, the old and new data identical code which indicates this will be stored into the nonvolatile memory in stead of the new block data. Here the default value of x is assumed to be 1.

S1: Have the difference data for all segments transferred from outside and receive it.

S2: Store the received difference data into the nonvolatile memory.

S3: Describe the value x into the nonvolatile memory as the restoration process segment number.

S4: Read the difference data for the segment x from the nonvolatile memory.

S5: Read one (1) code from the transferred difference data.

S6: If the code read in S5 is "duplicated code", proceed to S7, or is "updated code", proceed to S8.

S7: From the reference position indicated by "duplicated code", Output data of duplicated length indicated by "duplicated code" into the work memory, and proceed to S9.

S8: Output the updated data indicated by "updated code" into the work memory.

S9: Move the code reading position in the difference data backward for one (1) position.

S10: If the code reading position in the difference data is endmost of the difference data, proceed to S11, otherwise back to S5.

S11: Equally divide the segment x into n blocks.

S12: Compare the contents of old and new data in the m-th block, and if old and new data is identical, proceed to S13, otherwise proceed to S14.

S13: Describe the old and new identical code, which indicates that the contents of the old and new m-th blocks are identical, to the segment x of the nonvolatile memory.

S14: Store the new data of the m-th block restored on the work memory into the nonvolatile memory.

S15: If the m-th block is the final block of the segment x, proceed to S17, otherwise proceed to S16.

S16: Increment the value of m by 1 and back to S12.

S17: Describe the value (X−1) into the nonvolatile memory as the overwrite processing segment number.

S18: Read the content of the nonvolatile memory which stores data of the segment (X−1), and if the old and new identical code, which indicates that old and new data is identical for block m, is described, proceed to S20, otherwise proceed to S19.

S19: Overwrite new data of the block m of the segment (X−1) restored on the nonvolatile memory onto the block m of the segment (X−1) of old data stored in the internal memory.

S20: Increment the value of m by 1.

S21: If all the overwriting process is completed through the final block of the segment (X−1), proceed to S22, otherwise proceed to S18.

S22: In order to make next segment into the reading target, increment x by 1.

S23: If restoration of all the segments is completed, proceed to S24, otherwise back to S3.

S24: Overwrite new data of the final segment restored on the nonvolatile memory onto the final segment of old data stored in the internal memory.

Figure 14A:
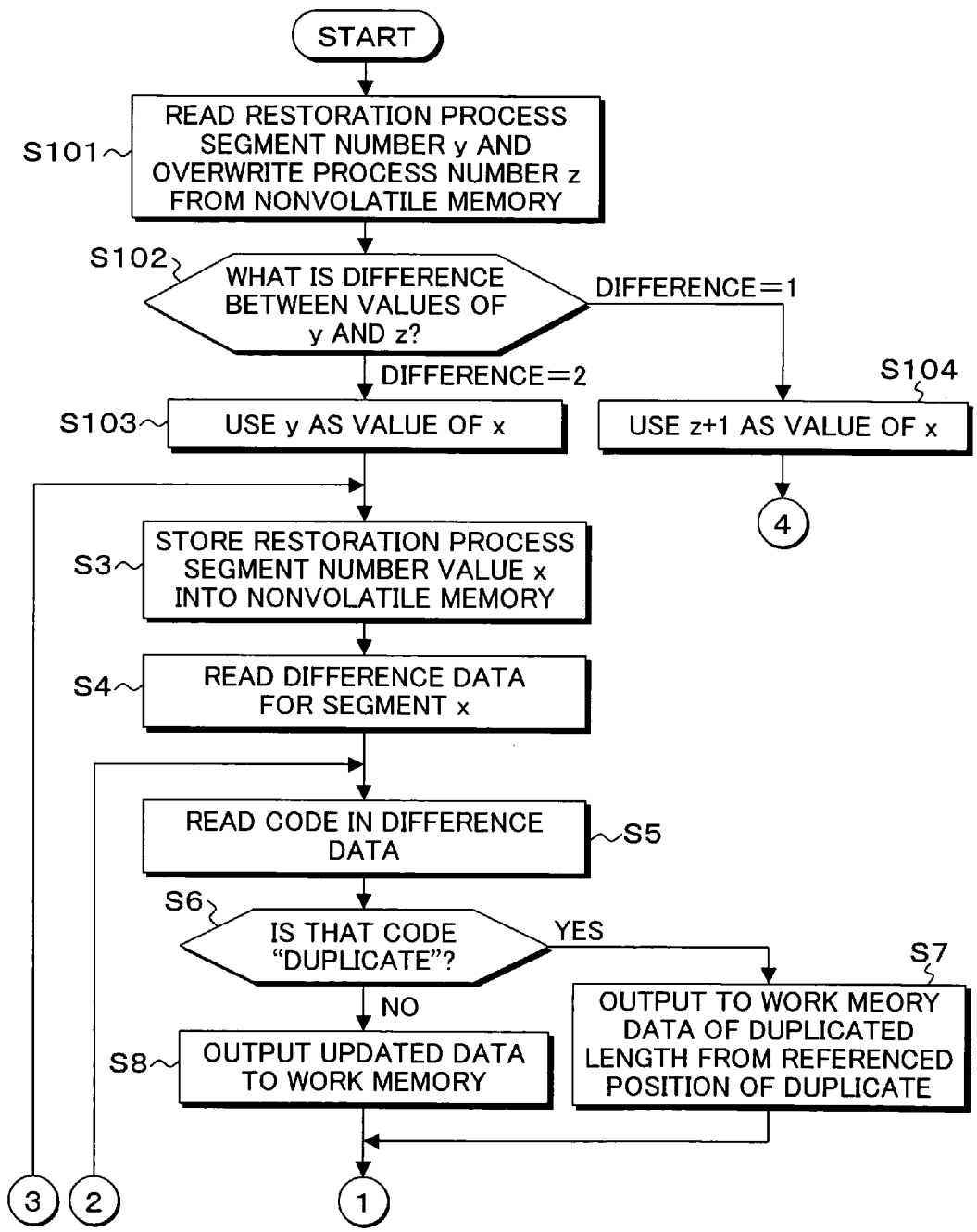
FIG. 14A is a flowchart of the data updating process according to the third embodiment of the invention, executed after power supply interrupted during updating of data is recovered.
Figure 14B:
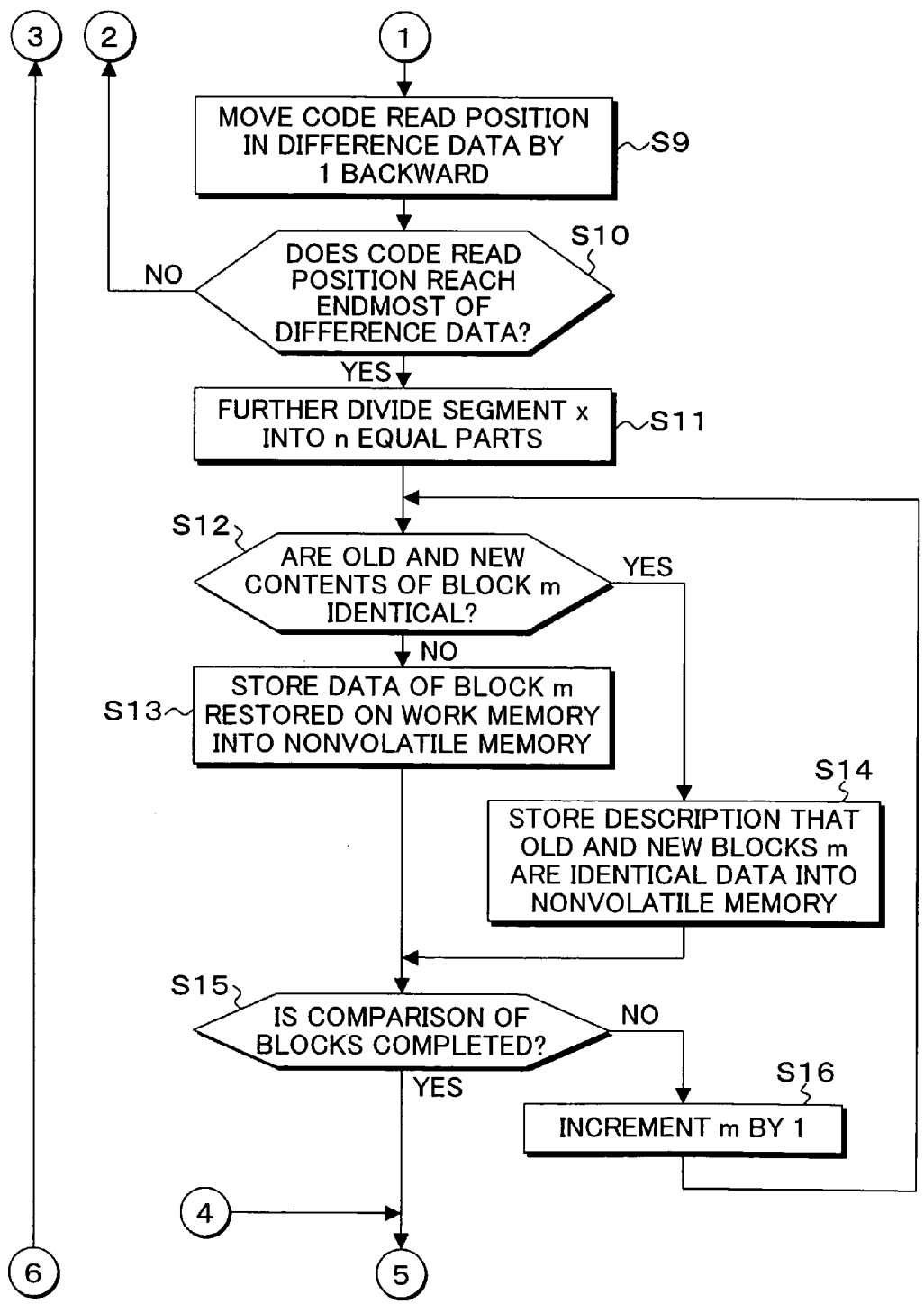
FIGS. 14B and 14C are flowcharts of the data updating process continued from FIG. 14A.
Figure 14C:
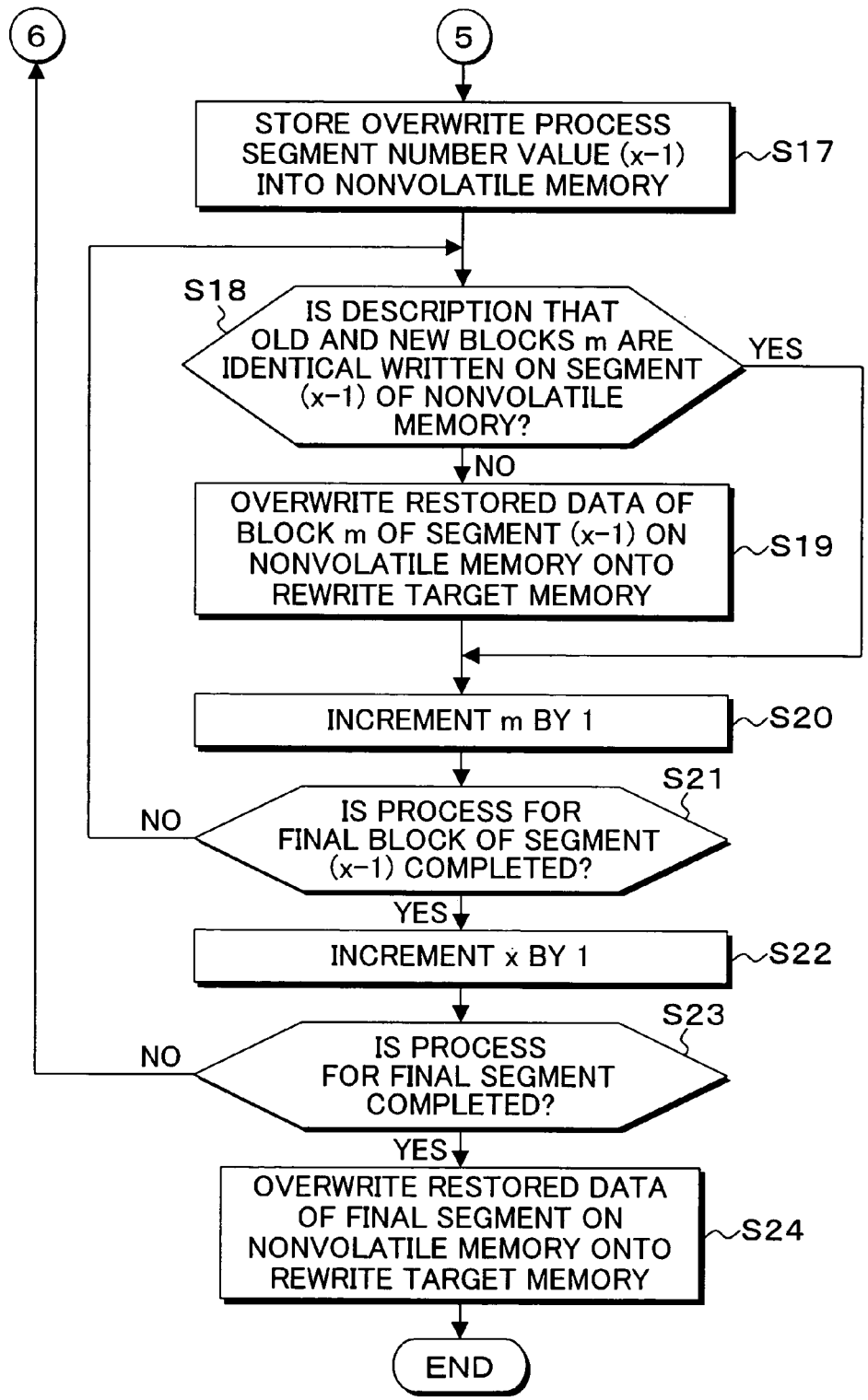

FIGS. 14A to 14C are flowcharts in the case where the updating process is resumed from the middle after the power supply is recovered, when the power supply is interrupted during the data updating process in FIGS. 13A to 13C. This process is the one in which processes of steps S1 and S2 in FIG. 13A are automatically converted to the processes of step S101 to S104, and step S3 to S23 is same as the data updating process of FIGS. 13A to 13C.

S101: Read the restoration process segment number y and the overwrite processing segment number z from the nonvolatile memory.

S102: If the difference between the restoration process segment number y and the overwrite processing segment number z is 1, decide that the power supply was interrupted during the overwriting process and proceed to s104, or if the difference is 2, decide that the power supply was interrupted during the restoration process and proceed to s103.

S103: Suppose that x=y, and proceed to S3.

S104: Suppose that x=z+1, and proceed to S17.

S3: Describe the value x into the nonvolatile memory as the restoration process segment number.

S4: Read the difference data for the segment x from the nonvolatile memory.

S5: Read one (1) code from the transferred difference data.

S6: If the code read in S5 is "duplicated code", proceed to S7, or is "updated code", proceed to S8.

S7: From the reference position indicated by "duplicated code", output data of duplicated length indicated by "duplicated code" into the work memory, and proceed to S9.

S8: Output the updated data indicated by "updated code" into the work memory.

S9: Move the code reading position in the difference data backward for one (1) position.

S10: If the code reading position in the difference data is endmost of the difference data, proceed to S11, otherwise back to S5.

S11: Equally divide the segment x into n blocks.

S12: Compare the contents of old and new data in the m-th block, and if old and new data is identical, proceed to S13, otherwise proceed to S14.

S13: Describe the old and new identical code, which indicates that the contents of the old and new m-th blocks are identical, to the segment x of the nonvolatile memory.

S14: Store the new data of the m-th block restored on the work memory into the nonvolatile memory.

S15: If the m-th block is the final block of the segment x, proceed to S17, otherwise proceed to S16.

S16: Increment the value of m by 1 and back to S12.

S17: Describe the value (X−1) into the nonvolatile memory as the overwrite processing segment number.

S18: Read the content of the nonvolatile memory which stores data of the segment (X−1), and if the old and new identical code, which indicates that old and new data is identical for block m, is described, proceed to S20, otherwise proceed to S19.

S19: Overwrite new data of the block m of the segment (X−1) restored on the nonvolatile memory onto the block m of the segment (X−1) of old data stored in the internal memory.

S20: Increment the value of m by 1.

S21: If all the overwriting process is completed through the final block of the segment (X−1), proceed to S22, otherwise proceed to S18.

S22: In order to make next segment into the reading target, increment x by 1.

S23: If restoration of all the segments is completed, proceed to S24, otherwise back to S3.

S24: Overwrite new data of the final segment restored on the nonvolatile memory onto the final segment of old data stored in the internal memory.

In the embodiments, though taken as an example is the case that difference data is generated in the base station and transferred to the cell phone which is the embedded system to execute the difference updating process, the invention is not limited to this and includes the case that difference data is transferred from any apparatus on the transmitting side to an apparatus equipped with the embedded system to execute the difference update of the data to be written.

Also, the present invention includes any variants without impairing the objects and advantages thereof and is not limited by the numerical values indicated in the embodiments.

As set forth hereinabove, according to the present invention, even if power supply is interrupted during an updating process from difference data of each segment, which is included in the processing procedure of the divided difference updating process on the embedded system of a cell phone, etc., it is possible to resume the updating process from that segment after power supply is recovered.

Also, at the time of power interruption during restoring data as well as at the time of power interruption during overwriting process onto old data, it is possible to decide the process suspended and continue from the process before interruption after power is recovered, and it is possible to resume the difference updating process without executing unnecessary restoration processes and overwriting processes.

Further, if new data restored from difference data of each segment is identical to old data which is the data to be written, the processing time will be reduced by making the writing of new data into the nonvolatile memory and the overwriting onto the memory which stores old data unnecessary, and by doing nothing and skipping the process when there is no need to execute the process.

What is claimed is:

1. A difference updating method comprising:
    a difference data reception step, with a difference data reception unit, receiving difference data of all the segments which is generated for each segment by dividing a new one of two old and new files into a plurality of segments of the same size and searching for a data row matching a data row in each segment within the range from the position which is one segment before the starting position of a target segment of the old file to the endmost of the old file and storing the received difference data into a nonvolatile memory;
    a restoration processing step, with a restoration processing unit, storing the restoration process segment number (X) indicative of a current process segment into the nonvolatile memory, thereafter restoring segment data from one segment of the difference data and storing the restored segment data into the nonvolatile memory; and
    an overwrite processing step, with an overwrite processing unit, storing the overwrite processing segment number (X−1) indicative of an immediately preceding process segment into the nonvolatile memory, thereafter reading from the nonvolatile memory the restored data which has been restored on the immediately preceding segment and overwriting the read restored data onto data to be rewritten in a nonvolatile memory.

2. The difference updating method according to claim 1, wherein the difference data reception step includes receiving the difference data for each segment which is generated by searching for a data row matching a data row in each segment within the range from the starting position of a target segment of the old file to the endmost of the old file.

3. The difference updating method according to claim 1, further comprising:
    a decision step, with a decision unit, deciding whether the power supply is interrupted during the restoration process of the segment data or the power supply is interrupted during the overwriting process of the segment data, after the power supply is recovered in the case of power interruption;
    a restoration resume step, with a restoration resume unit, resuming the restoration process from the head of the segment of the restoration process segment number read from the nonvolatile memory after the power recovery in the case where the power supply has been interrupted during the restoration process of the segment data; and an overwriting resume step, with an overwriting resume unit, resuming the overwriting process from the head of the overwrite processing segment number read from the nonvolatile memory after the power recovery in the case where the power supply has been interrupted during the overwriting process of the segment data.

4. The difference updating method according to claim 3, wherein the decision step includes calculating a difference between the restoration process segment number and the overwrite processing segment number after the power supply is recovered in the case of the power interruption, deciding that the power supply was interrupted during the restoration process if the difference is 1, and deciding that the power supply was interrupted during the overwriting process if the difference is 2.

5. The difference updating method according to claim 1, wherein the restoration processing step includes deciding whether the content of the restored segment data which is restored from one segment of the difference data and the content of the corresponding segment data of the data to be written are identical or not, and, if these are identical, describing into the nonvolatile memory that the old and the new are identical, instead of the restored segment data; and wherein the overwrite processing step includes skipping the overwriting of the restored segment data if it is described in the nonvolatile memory that the old and the new are identical.

6. The difference updating method according to claim 1, wherein the restoration processing step further includes equally dividing the restored segment data which is restored from one segment of the difference data into n pieces of restored block data, deciding whether the restored block data and the rewrite data are identical or not for each block, and, if these are identical, describing into the nonvolatile memory that the old and the new are identical, instead of the restored block data; and wherein the overwrite processing step includes skipping the overwriting of the restored block data if it is described in the nonvolatile memory that the old and the new are identical.

7. A difference updating method comprising:

a difference data reception step, with a difference data reception unit, generating difference data for each segment by dividing a new one of two old and new files into a plurality of segments of the same size and searching for a data row matching a data row in each segment within the range from the position which is one segment before the starting position of a target segment of the old file to the endmost of the old file, as well as equally dividing one segment of the old and new data into n blocks, deciding whether the block data of new file and the block data of old file are identical or not on a block-to-block basis, and, if these are identical, describing that the old and the new are identical into the difference data, instead of the difference block data, receiving the difference data of all the segments which has the description and storing the received difference data into a nonvolatile memory;

a restoration processing step, with a restoration processing unit, storing the restoration process segment number (X) indicative of a current process segment into the nonvolatile memory, thereafter restoring the block data which is divided into n pieces per one segment of the difference data and storing the restored block data into the nonvolatile memory; and an overwrite processing step, with an overwrite processing unit, storing the overwrite processing segment number (X−1) indicative of an immediately preceding process segment into the nonvolatile memory, thereafter reading from the nonvolatile memory the restored block data which is divided into n pieces per restored data which is restored on the immediately preceding segment and overwriting the read restored block data onto the data to be written in the nonvolatile memory.

8. The difference updating method according to claim 7, further comprising:

a decision step, with a decision unit, deciding whether the power supply is interrupted during the restoration process of the segment data or the power supply is interrupted during the overwriting process of the segment data, after the power supply is recovered in the case of power interruption;

a restoration resume step, with a restoration resume unit, resuming the restoration process from the head of the segment of the restoration process segment number read from the nonvolatile memory after the power recovery in the case where the power supply has been interrupted during the restoration process of the segment data; and an overwriting resume step, with an overwriting resume unit, resuming the overwriting process from the head of the overwrite processing segment number read from the nonvolatile memory after the power recovery in the case where the power supply has been interrupted during the overwriting process of the segment data.

9. The difference updating method according to claim 7, wherein the restoration processing step includes skipping the restoration process based on the difference block data and describing in the nonvolatile memory that the old and the new are identical, if it is described in the difference block data that the old and the new are identical, and wherein the overwrite processing step includes skipping the overwriting of the restored block data, if it is described in the nonvolatile memory that the old and the new are identical.

10. A program allowing a computer to execute:

a difference data reception step receiving difference data of all the segments which is generated for each segment by dividing a new one of two old and new files into a plurality of segments of the same size and searching for a data row matching a data row in each segment within the range from the position which is one segment before the starting position of a target segment of the old file to the endmost of the old file and storing the received difference data into a nonvolatile memory;

a restoration processing step storing the restoration process segment number (X) indicative of a current process segment into the nonvolatile memory, thereafter restoring segment data from one segment of the difference data and storing the restored segment data into the nonvolatile memory; and an overwrite processing step storing the overwrite processing segment number (X−1) indicative of an immediately preceding process segment into the nonvolatile memory, thereafter reading from the nonvolatile memory the restored data which has been restored on the immediately preceding segment and overwriting the read restored data onto data to be rewritten in the nonvolatile memory.

11. The program according to claim 10, wherein the difference data reception step includes receiving the difference data for each segment which is generated by searching for a data row matching a data row in each segment within the range from the starting position of a target segment of the old file to the endmost of the old file.

12. The program according to claim 10, further comprising:
a decision step deciding whether the power supply is interrupted during the restoration process of the segment data or the power supply is interrupted during the overwriting process of the segment data, after the power supply is recovered in the case of power interruption;
a restoration resume step resuming the restoration process from the head of the segment of the restoration process segment number read from the nonvolatile memory after the power recovery in the case where the power supply has been interrupted during the restoration process of the segment data; and
an overwriting resume step resuming the overwriting process from the head of the overwrite processing segment number read from the nonvolatile memory after the power recovery in the case where the power supply has been interrupted during the overwriting process of the segment data.

13. The program according to claim 12, wherein the decision step includes calculating a difference between the restoration process segment number and the overwrite processing segment number after the power supply is recovered in the case of the power interruption, deciding that the power supply was interrupted during the restoration process if the difference is 1, and deciding that the power supply was interrupted during the overwriting process if the difference is 2.

14. The program according to claim 10, wherein the restoration processing step includes deciding whether the content of the restored segment data which is restored from one segment of the difference data and the content of the corresponding segment data of the data to be written are identical or not, and, if these are identical, describing into the nonvolatile memory that the old and the new are identical, instead of the restored segment data; and wherein
the overwrite processing step includes skipping the overwriting of the restored segment data if it is described in the nonvolatile memory that the old and the new are identical.

15. The program according to claim 10, wherein the restoration processing step further includes equally dividing the restored segment data which is restored from one segment of the difference data into n pieces of restored block data, deciding whether the restored block data and the rewrite data are identical or not for each block, and, if these are identical, describing into the nonvolatile memory that the old and the new are identical, instead of the restored block data; and wherein
the overwrite processing step includes skipping the overwriting of the restored block data if it is described in the nonvolatile memory that the old and the new are identical.

16. A program allowing a computer to execute:
a difference data reception step generating difference data for each segment by dividing a new one of two old and new files into a plurality of segments of the same size and searching for a data row matching a data row in each segment within the range from the position which is one segment before the starting position of a target segment of the old file to the endmost of the old file, as well as equally dividing one segment of the old and new data into n blocks, deciding whether the block data of new file and the block data of old file are identical or not on a block-to-block basis, and, if these are identical, describing that the old and the new are identical into the difference data, instead of the difference block data, receiving the difference data of all the segments which has the description and storing the received difference data into a nonvolatile memory;
a restoration processing step storing the restoration process segment number (X) indicative of a current process segment into the nonvolatile memory, thereafter restoring the block data which is divided into n pieces per one segment of the difference data and storing the restored block data into the nonvolatile memory; and
an overwrite processing step storing the overwrite processing segment number (X−1) indicative of an immediately preceding process segment into the nonvolatile memory, thereafter reading from the nonvolatile memory the restored block data which is divided into n pieces per restored data which is restored on the immediately preceding segment and overwriting the read restored block data onto the data to be written in the nonvolatile memory.

17. The program according to claim 16, wherein the difference data reception step includes receiving the difference data for each segment which is generated by searching for a data row matching a data row in each segment within the range from the starting position of a target segment of the old file to the endmost of the old file.

18. The program according to claim 16, further comprising:
a decision step deciding whether the power supply is interrupted during the restoration process of the segment data or the power supply is interrupted during the overwriting process of the segment data, after the power supply is recovered in the case of power interruption;
a restoration resume step resuming the restoration process from the head of the segment of the restoration process segment number read from the nonvolatile memory after the power recovery in the case where the power supply has been interrupted during the restoration process of the segment data; and
an overwriting resume step resuming the overwriting process from the head of the overwrite processing segment number read from the nonvolatile memory after the power recovery in the case where the power supply has been interrupted during the overwriting process of the segment data.

19. The program according to claim 18, wherein the decision step includes calculating a difference between the restoration process segment number and the overwrite processing segment number after the power supply is recovered in the case of the power interruption, deciding that the power supply was interrupted during the restoration process if the difference is 1, and deciding that the power supply was interrupted during the overwriting process if the difference is 2.

20. The program according to claim 16, wherein
the restoration resume step includes skipping the restoration process based on the difference block data and describing in the nonvolatile memory that the old and the new are identical, if it is described in the difference block data that the old and the new are identical, and wherein the overwrite processing step includes skipping the overwriting of the restored block data, if it is described in the nonvolatile memory that the old and the new are identical.

21. A difference updating apparatus comprising:

a difference data reception unit for receiving difference data of all the segments which is generated for each segment by dividing a new one of two old and new files into a plurality of segments of the same size and searching for a data row matching a data row in each segment within the range from the position which is one segment before the starting position of a target segment of the old file to the endmost of the old file and storing the received difference data into a nonvolatile memory;

a restoration processing unit for storing the restoration process segment number (X) indicative of a current process segment into the nonvolatile memory, thereafter restoring segment data from one segment of the difference data and storing the restored segment data into the nonvolatile memory;

an overwrite processing unit for storing the overwrite processing segment number (X−1) indicative of an immediately preceding process segment into the nonvolatile memory, thereafter reading from the nonvolatile memory the restored data which has been restored on the immediately preceding segment and overwriting the read restored data onto data to be rewritten in the nonvolatile memory;

a decision unit for deciding whether the power supply is interrupted during the restoration process of the segment data or the power supply is interrupted during the overwriting process of the segment data, after the power supply is recovered in the case of power interruption;

a restoration resume unit for resuming the restoration process from the head of the segment of the restoration process segment number read from the nonvolatile memory after the power recovery in the case where the power supply has been interrupted during the restoration process of the segment data; and an overwriting resume unit for resuming the overwriting process from the head of the overwrite processing segment number read from the nonvolatile memory after the power recovery in the case where the power supply has been interrupted during the overwriting process of the segment data.

22. A difference updating apparatus comprising:

a difference data reception unit for generating difference data for each segment by dividing a new one of two old and new files into a plurality of segments of the same size and searching for a data row matching a data row in each segment within the range from the position which is one segment before the starting position of a target segment of the old file to the endmost of the old file, as well as equally dividing one segment of the old and new data into n blocks, deciding whether the block data of new file and the block data of old file are identical or not on a block-to-block basis, and, if these are identical, describing that the old and the new are identical into the difference data, instead of the difference block data, receiving the difference data of all the segments which has the description and storing the received difference data into a nonvolatile memory;

a restoration processing unit for storing the restoration process segment number (X) indicative of a current process segment into the nonvolatile memory, thereafter restoring the block data which is divided into n pieces per one segment of the difference data and storing the restored block data into the nonvolatile memory;

an overwrite processing unit for storing the overwrite processing segment number (X−1) indicative of an immediately preceding process segment into the nonvolatile memory, thereafter reading from the nonvolatile memory the restored block data which is divided into n pieces per restored data which is restored on the immediately preceding segment and overwriting the read restored block data onto the data to be written in the nonvolatile memory;

a decision unit for deciding whether the power supply is interrupted during the restoration process of the segment data or the power supply is interrupted during the overwriting process of the segment data, after the power supply is recovered in the case of power interruption;

a restoration resume unit for resuming the restoration process from the head of the segment of the restoration process segment number read from the nonvolatile memory after the power recovery in the case where the power supply has been interrupted during the restoration process of the segment data; and an overwriting resume unit for resuming the overwriting process from the head of the overwrite processing segment number read from the nonvolatile memory after the power recovery in the case where the power supply has been interrupted during the overwriting process of the segment data.

* * * * *